(12) United States Patent
Lee

(10) Patent No.: US 8,504,712 B2
(45) Date of Patent: Aug. 6, 2013

(54) METHOD AND APPARATUS FOR MANAGING MULTI-STREAMING CONTENTS AND FOR CONTROLLING OF CHANGING PLAYERS DURING PLAYBACK OF MULTI-STREAMING CONTENTS

(75) Inventor: Jae Wook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 713 days.

(21) Appl. No.: 12/689,992

(22) Filed: Jan. 19, 2010

(65) Prior Publication Data

US 2010/0185775 A1 Jul. 22, 2010

Related U.S. Application Data

(60) Provisional application No. 61/145,584, filed on Jan. 19, 2009.

(51) Int. Cl.
*G06F 15/16* (2006.01)

(52) U.S. Cl.
USPC .......................................... 709/231; 709/224

(58) Field of Classification Search
USPC ......................................... 709/203, 231, 224
See application file for complete search history.

(56) References Cited

U.S. PATENT DOCUMENTS

| | | | |
|---|---|---|---|
| 7,665,115 B2* | 2/2010 | Gallo et al. | 725/110 |
| 7,725,557 B2* | 5/2010 | Klemets et al. | 709/213 |
| 2005/0135341 A1* | 6/2005 | Kim | 370/352 |
| 2006/0193608 A1* | 8/2006 | Kim | 386/126 |
| 2007/0005788 A1* | 1/2007 | Kim et al. | 709/231 |
| 2007/0112932 A1* | 5/2007 | Min et al. | 709/217 |
| 2009/0193474 A1* | 7/2009 | Stein | 725/82 |

* cited by examiner

*Primary Examiner* — El Hadji Sall
(74) *Attorney, Agent, or Firm* — Birch, Stewart, Kolasch & Birch, LLP

(57) ABSTRACT

Methods and apparatus for managing multi-streaming contents and for controlling of changing media players (media renderers) during playback of the multi-streaming contents are disclosed. An exemplary of the method of controlling for changing a media player from a first player to a second player, in a control device is disclosed. The method can include receiving multi-streaming capability from the second player, the multi-streaming capability including information about at least one of multi-streaming contents performable in the second player. The method can also include receiving streaming content information and playing status information from the first player, wherein the playing status information includes playing time information of streaming content being performed at the first player. The method can also include determining streaming content desired to be performed at the second player by comparing the multi-streaming capability of the second player with streaming content information of the first player. The method can also include generating current playing information of the streaming content that is determined to be performed at the second player, based on the playing time information. The method can also include transmitting the current playing information of the streaming content to a media server which is able to communicate with the second player.

9 Claims, 27 Drawing Sheets

Argument for CheckMsrbCapability()

| Argument | Direction | relatedStateVariable | |
|---|---|---|---|
| RestructuredMsrb | IN | A_ARG_TYPE_MSRB | ~910 |
| FilteredMsrb | OUT | A_ARG_TYPE_MSRB | ~920 |

FIG. 10A

| Group IDs | Individual IDs |
|---|---|
| GroupConnectionID(GID) | Primary ConnectionID, Secondary ConnectionIDs |
| GroupAVTID | Primary AVTID, Secondary AVTIDs |
| GroupRCSID | Primary RCSID, Secondary RCSIDs |

FIG. 10B

| Actions for Group | Input | Output |
|---|---|---|
| PrepareForGroupConnection() | None | Group IDs |
| AddToGroup() | GID ConnectionID | None |
| RemoveFromGroup() | GID ConnectionID | None |
| GetGroupIDs() | None | GIDs |
| GetGroupInfo() | GID | GroupAVTID, GroupRCSID |
| GetGroupIDInfo() | GID | Primary ConnectionID, Secondary ConnectionIDs |

1011 — PrepareForGroupConnection()
1012 — AddToGroup()
1013 — RemoveFromGroup()
1014 — GetGroupIDs()
1015 — GetGroupInfo()
1016 — GetGroupIDInfo()

METHOD AND APPARATUS FOR MANAGING MULTI-STREAMING CONTENTS AND FOR CONTROLLING OF CHANGING PLAYERS DURING PLAYBACK OF MULTI-STREAMING CONTENTS

This application claims the benefit of the U.S. Provisional Application No. 61/145,584, filed on Jan. 19, 2009, which is hereby incorporated by reference as if fully set forth herein.

BACKGROUND OF THE INVENTION

1. Field of the Invention

The present invention relates generally to a method and an apparatus for processing multi streaming contents.

2. Discussion of the Related Art

A network proposed for home networking, for example UPnP, consists of a plurality of UPnP devices, services, and control point (CP). A service on UPnP network represents a smallest control unit on the network, which is modeled by state variables. A CP (Control Point) on UPnP network represents a control application equipped with functions for detecting and controlling other devices and/or services. A CP is operated on a physical device such as a PDA providing the user with a convenient interface.

FIG. 1 illustrates a block diagram representing conventional UPnP AV architecture and services. As shown in FIG. 1, a UPnP AV home network comprises a media server (MS) 120 providing a home network with media data, a media renderer (MR) 130 playing media data through the home network, and an AV control point 110 controlling the media server 120 and the media renderer 130. In here, the media renderer 130 can be broadly called as a media player or a player. The media server 120 and the media renderer 130 are devices controlled by the control point 110. Further, one of media renderers can be a control point.

The media server 120 includes CDS (Content Directory Service) 121, CM (Connection Manager) 122, and AVT (AV Transport) 123. The CDS 121 stores media files and information of containers (which correspond to directories) as the corresponding object information. An 'object' is a comprehensive terminology indicating both an item having information about more than one media file and a container having information about a directory. Depending on circumstances, the terminology of 'object' can be used to specify either an item or a container. One item corresponds to one or more than one media file. For example, multiple media files of the same content but with different bit rates are managed as a single item. The CM 122 service is used to manage a connection with a media renderer 130 via standard UPnP actions 141. The AVT 123 service is used to transmit AV data to a media renderer 130 via transfer protocol 142 and standard UPnP actions 141. In a specific exemplary, the AVT 123 service can not be equipped in the media server 120, instead only equipped in the media renderer 130.

The media renderer 130 includes RCS (Rendering Control Service) 131, CM (Connection Manager) 132, and AVT (AV Transport) 133. The RCS 131 is used to control a presentation of media data received from the media server 120. The CM 122 service is used to manage a connection with a media server 122 via standard UPnP actions 141. The AVT 123 service is used to receive AV data from the media server 120 via transfer protocol 142 and standard UPnP actions 141.

The conventional UPnP AV architecture and services could support concurrent streaming which can be realized by playback mechanism step by step. But when a user wants to play a video file which is associated with a closed caption file or other video file which has different view of angle such as multi-angle security video, then the user should have to play both video and it's associated caption file or multi-angle video file at the same time with time synchronization. In this case, there is no standard way of exposing of metadata and steaming of multiple contents. In this case, the multi-streaming means a mechanism which can support not only playback of multiple contents but also exposing of associated contents and playing those contents simultaneously. To support these kinds of mechanism, some additional works are needed.

Also, in a specific case, user may wish to switch or change media renderers during playback of media or content. For example, a user watches a movie using a first media renderer (e.g., mobile phone) while moving and after he arrives home he may wish to change a media renderer to a second media renderer (e.g., DTV in living room) form the first media renderer (e.g., mobile phone) because the second media renderer (DTV) may have a large size display device and a better audio device than the first media renderer (mobile phone). But, there is also no standard way of changing media renderers during playback of multi-steaming contents. To support these kinds of mechanism, some additional works are also needed.

SUMMARY OF THE INVENTION

Accordingly, the exemplary embodiments of the present invention provide methods and apparatus for managing multi-streaming contents and for controlling of changing media players (media renderers) during playback of the multi-streaming contents.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

According to an aspect of the present embodiment, a method of controlling for changing a media player from a first player to a second player, in a control device, is disclosed. The method can include receiving multi-streaming capability from the second player, the multi-streaming capability including information about at least one of multi-streaming contents performable in the second player. The method can also include receiving streaming content information and playing status information from the first player, wherein the playing status information includes playing time information of streaming content being performed at the first player. The method can also include determining streaming content desired to be performed at the second player by comparing the multi-streaming capability of the second player with streaming content information of the first player. The method can also include generating current playing information of the streaming content that is determined to be performed at the second player, based on the playing time information. The method can also include transmitting information about the streaming content desired to be performed at the second player and the current playing information of the streaming content to a media server which is able to communicate with the second player.

In the above aspect of the present invention, the method further includes providing a structure of multi-streaming contents to the second player with a request of multi-streaming capability of the second player, wherein the structure of multi-streaming contents include at least one primary stream component and at last one secondary stream component.

In the above aspect of the present invention, the at least one primary stream component is related to a mandatory playback stream, and the at least one secondary stream component is related to an optional playback stream.

In the above aspect of the present invention, the playing time information includes at least one of total playback time, start time and playback duration time.

In the above aspect of the present invention, the current playing information includes information indicating that the second player performs playback of streaming content which sequentially follows content performed on the playback duration time.

According to another aspect of the present embodiment, a method controlling for changing a media player from a first player to a second player, in a first player, is disclosed. The method can include receiving multi-streaming capability from the second player, the multi-streaming capability including information about at least one of multi-streaming contents performable in the second player. The method can also include determining streaming content desired to be performed at the second player by comparing the multi-streaming capability of the second player with streaming content being performed at the first player. The method can also include generating current playing information of the streaming content that is determined to be performed at the second player, based on playing time information of the streaming content being performed at the first player. The method can also include transmitting information about the streaming content desired to be performed at the second player and the current playing information of the streaming content to a media server which is able to communicate with the second player.

According to another aspect of the present embodiment, a method of processing multi-streaming contents in a second player is disclosed. The method can include receiving a request of multi-streaming capability from a control device. The method can include transmitting the multi-streaming capability to the control device in response to the request, the multi-streaming capability including information about at least one of multi-streaming contents performable in the second player. The method can include receiving information about streaming content desired to be performed at the second player and current playing information of the streaming content from the control device, wherein the current playing information is derived from playing time information of the streaming content previously performed at a first player. The method can include communicating with a media server for receiving the streaming content. The method can include performing playback of the streaming content received from the media server based on the current playing information of the streaming content.

According to another aspect of the present embodiment, a first player performing a method of controlling for changing a media player is disclosed. The first player can include a rendering module for performing playback of streaming content. The first player can also include a recording medium storing a computer program, the computer program performing computer process, the process comprising; receiving multi-streaming capability from the second player, the multi-streaming capability including information about at least one of multi-streaming contents performable in the second player, determining streaming content desired to be performed at the second player by comparing the multi-streaming capability of the second player with streaming content being performed at the rendering module, generating current playing information of the streaming content that is determined to be performed at the second player based on playing time information of the streaming content being performed at the rendering module, and transmitting information about the streaming content desired to be performed at the second player and the current playing information of the streaming content to a media server which is able to communicate with the second player.

According to another aspect of the present embodiment, a player performing a method of processing streaming content is disclosed. The player can include a recording medium storing a computer program, the computer program performing computer process, the process comprising; receiving a request of multi-streaming capability from an external control device, transmitting the multi-streaming capability to the external control device in response to the request, the multi-streaming capability including information about at least one of multi-streaming contents performable in the player, receiving information about streaming content desired to be performed at the player and current playing information of the streaming content from the external control device, and communicating with a media server for receiving the streaming content, wherein the current playing information is derived from playing time information of streaming content previously performed at other external player. The player can also include a rendering module for processing the streaming content received from the media server based on the current playing information of the streaming content.

According to another aspect of the present embodiment, a computer-readable recording medium is disclosed. The computer-readable recording medium has embodied thereon a computer program for performing a method of controlling for changing a media player from a first player to a second player. The computer program method can include receiving multi-streaming capability from the second player, the multi-streaming capability including information about at least one of multi-streaming contents performable in the second player; determining streaming content desired to be performed at the second player by comparing the multi-streaming capability of the second player with streaming content being performed at the first player; generating current playing information of the streaming content that is determined to be performed at the second player, based on playing time information of the streaming content being performed at the first player; and transmitting information about the streaming content desired to be performed at the second player and the current playing information of the streaming content to a media server which is able to communicate with the second player.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 illustrates a program showing the structure of multi-streaming contents according to an embodiment of the present invention;

FIG. 8A illustrates a structure of actions defined in association with multi stream capability according to an embodiment of the present invention;

FIGS. 10A and 10B illustrate a structure of actions defined in association with group connection information according to an embodiment of the present invention;

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Figure 1:
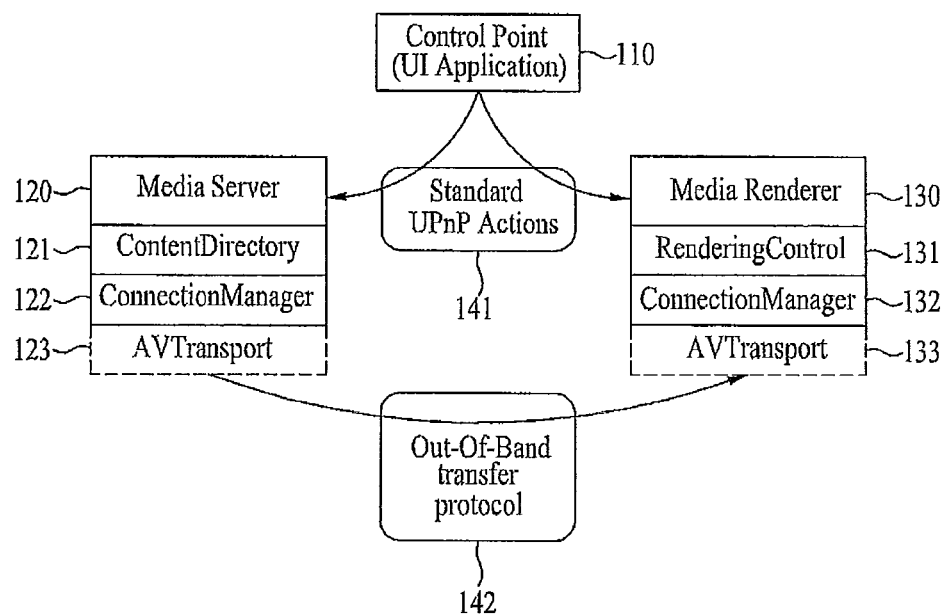
FIG. 1 illustrates the structure of a conventional UPnP AV network.
Figure 2:
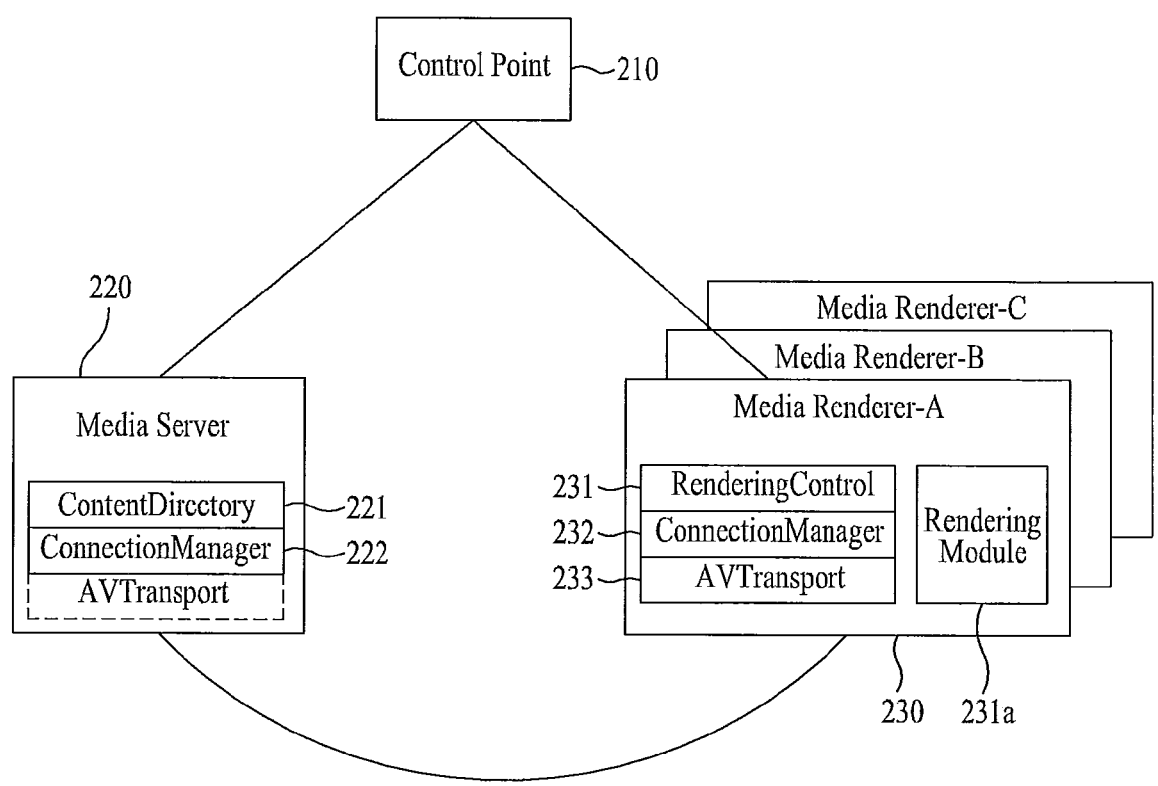
FIG. 2 illustrates a block view showing a UPnP AV network according to an embodiment of the present invention.

FIG. 2 illustrates networked devices carrying out structuring of item information that enables multi-presentation of multiple content sources and signal processing between devices and/or services according to an embodiment of the present invention. In the present embodiment, one content source indicates a multiple component; a multiple component comprises multiple components that are supposed to be presented in association with each other. Streaming for presenting or playing multiple contents in parallel with time synchronization among the streams is called 'multi-streaming' or 'multi-content streaming'. Also, content included in the multi-streaming is 'multi-streaming contents' or 'multi-streaming resources'. Meanwhile, streaming of multiple components belonging to a single content source is called 'multiple streaming'.

The network of FIG. 2 is UPnP AV network comprising a control point 210, a media server 220, and multiple media renderers including a media renderer A 230. Although subsequent description of the present embodiments is given to networked devices and/or services based on UPnP standard, what are described in the following can be directly applied to other network standards by adaptively substituting necessary elements with regard to differences of the standards where the present invention may apply. In this regard, therefore, the present invention is not limited to a network based on UPnP.

CDS 221 (which can be a processor that runs software) within the media server 220 carries out structuring of item information for multi-streaming according to the present embodiment. In one embodiment of the present invention, the control point 210 plays a primary role in signal processing between devices and/or services for multi-streaming according to the present invention by following a procedure illustrated in FIG. 3.

Description of configuration of devices and associated signal processing given below is based on a pull method, which is one of two methods for streaming a media component. The other method is a push method. A difference between the two methods lies in the direction of an action; and accordingly, the object of the action can only be either a media server or a media renderer. Since the method for carrying out an action described below can be equally applied to both push and pull methods, the scope of the present invention is not limited by those methods illustrated in the drawings and descriptions.

The CDS 221 within the media server 220 creates item information about content sources and components, namely meta data in a particular language (e.g., in XML format) by searching media files stored in a mass storage such as a hard disk or a separate removable recording medium such as an optical disk. Media files associated with each other for synchronized presentation are treated as a single content source and item information about the single content source is created.

The CDS 221 figures out interrelationship between media files considered as a single content source and whether a media file is a main component or an auxiliary component by utilizing, for example the name of each media file and/or extension of the file. If necessary, information about the property of each file namely, whether the file is text or image and/or an encoding method can also be obtained from the extension of the corresponding file. Information of each file can also be obtained by interpreting header information of the file. Alternatively, other application programs can write the aforementioned information in a database with respect to media files stored in a mass storage (or media files stored in a removable recording medium), wherein the database can be located in the same recording medium.

Item information created in the CDS 221 are transferred from the CDS 221 to the CP 210 in response to a browsing action or a search action and are interpreted by the CP 210. According to the interpretation, the CP 210 provides the user with relevant information for selecting content and/or a component to play. According to the user's input, an operation of multi-streaming is carried out. Further, when a content source is a multiple component, multiple streaming can be supported. Detailed descriptions of the operation are given below.

Figure 3:
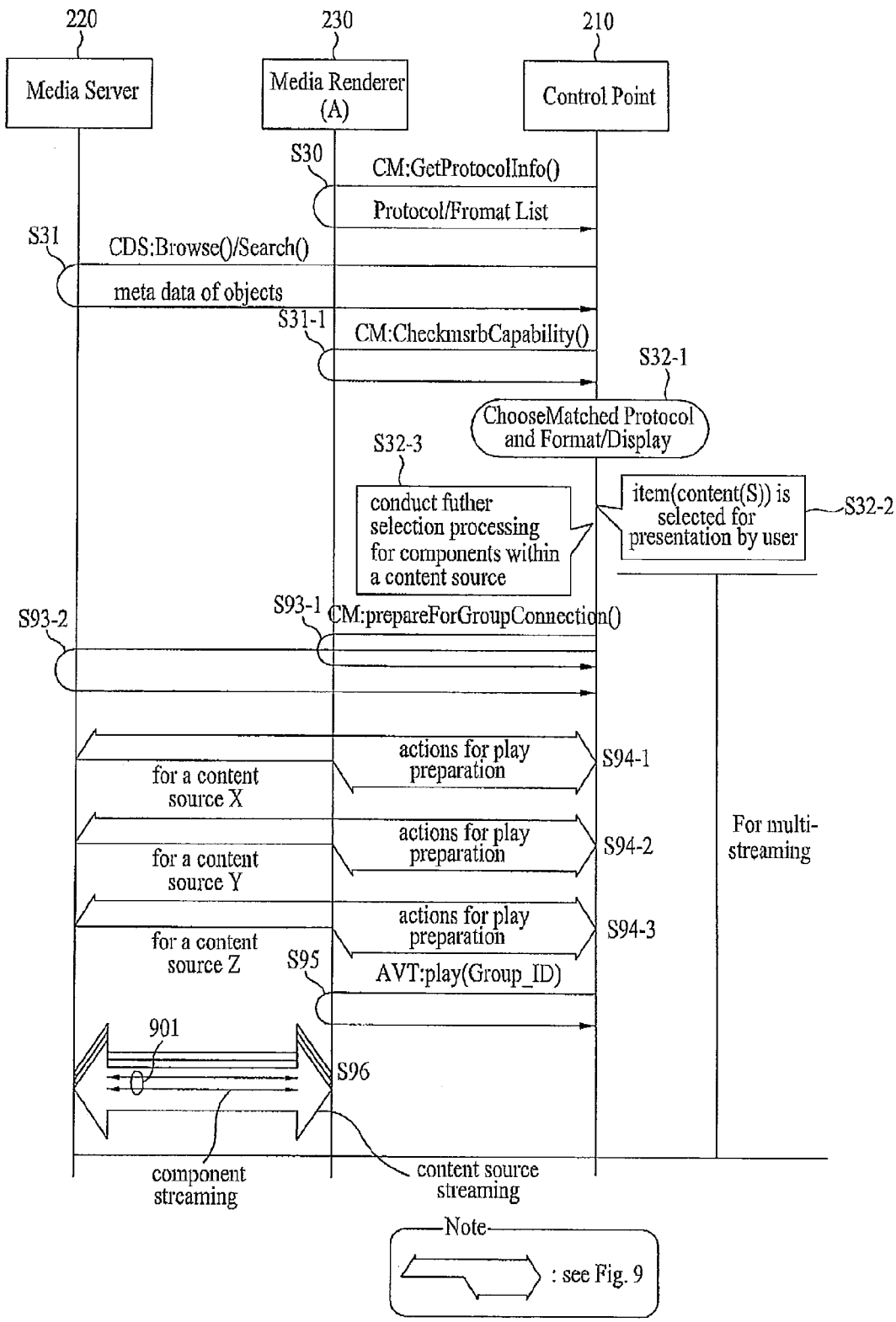
FIG. 3 illustrates a signal flow between devices and/or services for performing playback of multi-streaming contents according to an embodiment of the present invention.

FIG. 3 illustrates a signal flow between devices and/or services for performing playback of multi-streaming content according to an embodiment of the present invention. The CP 210 requests and obtains supported protocol information from a media renderer A 230 (S30). The Item information created by CDS 221 within the media server 220 through the aforementioned method is transferred from the CDS 221 to the CP 210 by a browsing action or a search action of the CP 210 (S31). The CP 210, from among information of objects and content sets received from the step S31, provides the user through an appropriate user interface (UI) only with those objects (items) having protocol information supported by the media renderer A 230 that the user has specified for presentation of content (S32-1). At this time, the CP 210 analyzes information received by an action and carries out subsequent operations (S32-2) that allow the user to select desired content or a desired content set and component within the content.

Figure 6A:
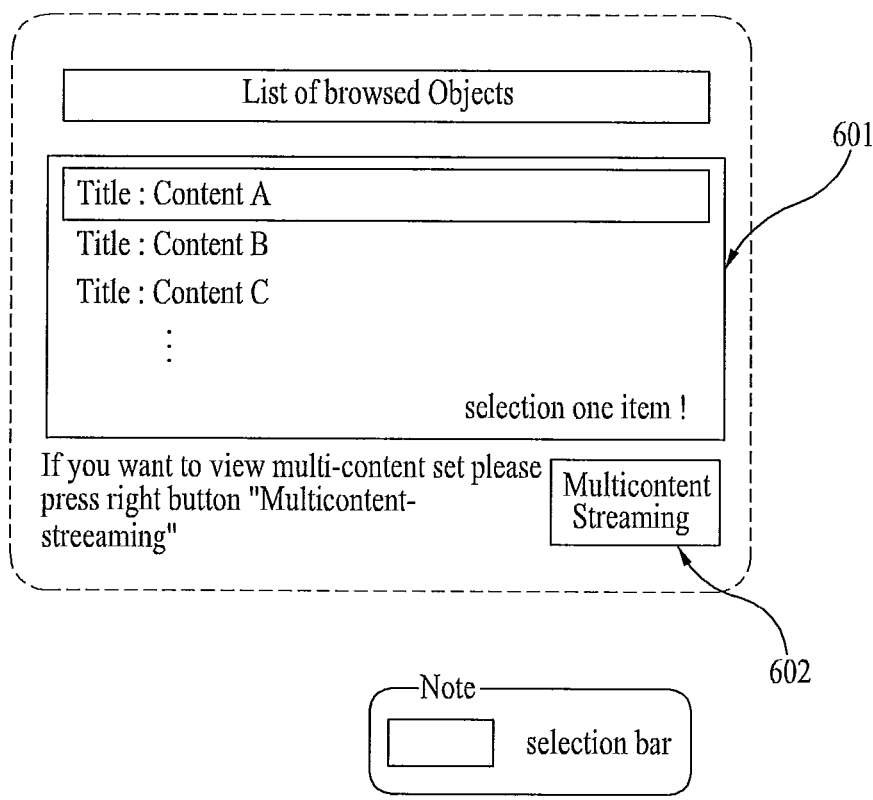
FIGS. 6A and 6B respectively illustrate examples of a screen according to an embodiment of the present invention, when a selected item is about a content set, the screen providing an input interface for the user to select a content source within the set.

From received item information, as shown in FIG. 6A, only item information about a single content source is extracted and listed 601. If item information about a content set is included in the received item information, a menu or a button 602 by which the user can select multi-content streaming can be provided on a screen. If the user requests 'multi-content streaming' (that is 'multi-streaming'), the CP 210 provides a screen listing items, thereby allowing the user to select one content set item from the listed items.

Figure 6B:
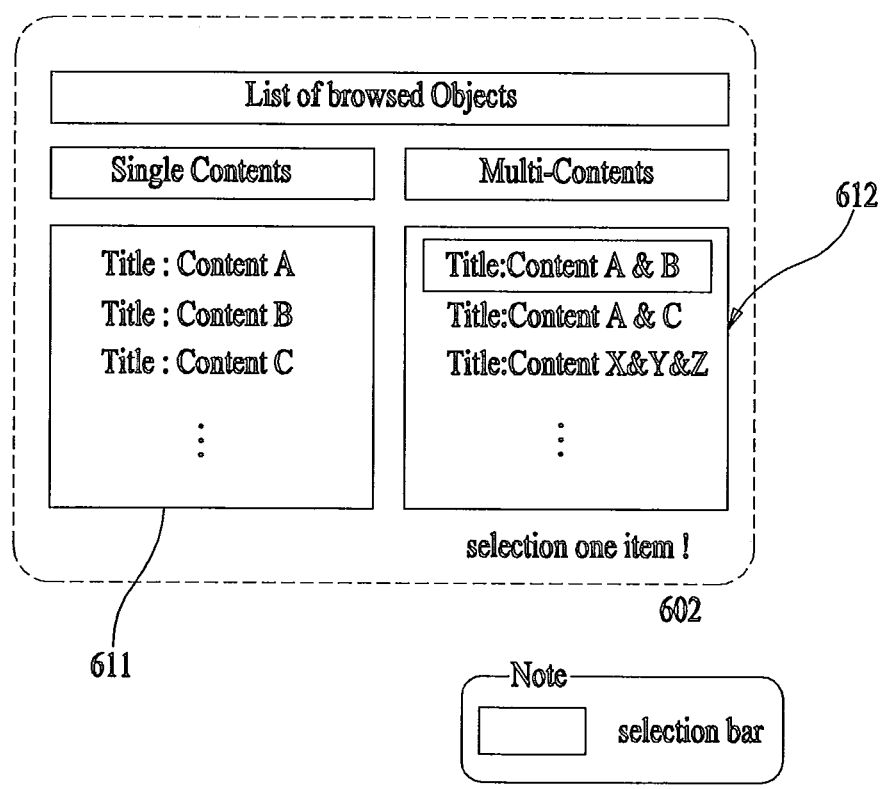

In another exemplary embodiment, information received by an action is analyzed and if item information about a content set is included as shown in FIG. 6B, a window of single content 611 and a window of multiple content 612 are displayed together separated from each other.

If an item is selected from a selection screen provided as shown in FIG. 6A or 6B and the selected item is about a content set for multi-streaming, the CP 210 analyzes the selected item information and checks each individual content source comprising a content set and provides a window that allows selection of the content sources. For example, if a selected item is about a content set consisting of content sources X, Y, and Z, the CP 210 may output information that helps the user recognize content sources X, Y, and Z. The information can be a list of entries having file names (e.g., 'Terminator' and 'Star Wars') of resources whose attributes are video. In another exemplary embodiment according to the present invention, the CP 210 may output a list of each entry having a phrase (or a clause) obtained by dividing the text of a title based on a conjunction in the title with respect to a selected content set.

In one embodiment according to the present invention, the CP 210, in selecting a content source within a content set, can assume that selection of a particular content source is mandatory. For example, if information about content sources X, Y, Z is recorded in a content set in a sequential order, a window is provided such that the user cannot select a content source X whereas the user can select only Y and Z. That is to say, multi-content streaming can be carried out by X+Y (where the user selects Y), X+Z (where the user selects Z), or X+Y+Z (where the user selects both X and Y). In another embodiment, in the above example, if Y and Z have been given for multi-content streaming but the user did not select either of them, X alone is streamed.

In a further embodiment according to the present invention, to support multi-content streaming of X and Y or X and Z, item information about a content set of X and Y or X and Z is created in addition to item information about a content set of X, Y and Z.

If one or more than one content source is selected during a selection procedure of each individual content source within a content set, the CP 210, with respect to each selected content source, carries out the following operations (S32-3) that select components belonging to the source.

Figure 7A:
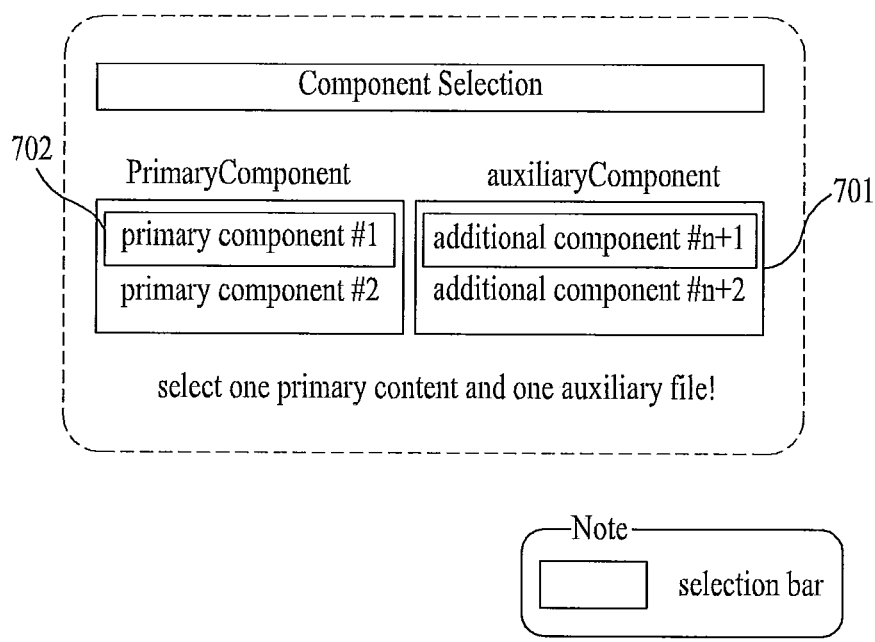
FIGS. 7A and 7B respectively illustrate examples of a screen according to an embodiment of the present invention, when a single content source is a multiple component that requires synchronized playback, the screen providing an input interface for the user to select resources.

The CP 210 first searches resources (components) of video attribute which are grouped together and displays the resources for the user as shown in FIG. 7A. Then, The CP 210 receives user's selection of a component. In particular, a resource of video attribute may become a main component. Although components included same video attribute are all the same content, respective components can have different bit rates or employ different encoding methods. If a single main component is selected, the CP 210 lists 701 in a separate window thereby allowing the user to select a component. A component selected at this time is called an auxiliary component to distinguish from a previously selected main component.

A window for selection of a main component and a window for selection of an auxiliary component can be displayed simultaneously on a screen instead of being displayed sequentially. When a selection operation is activated in a selection window for an auxiliary component, a component already selected in a different window is displayed with an outstanding mark 702 differentiating the component from other components that have not been selected. For example, by inverting the display of the selected component, the user can easily recognize the selected component.

Figure 7B:
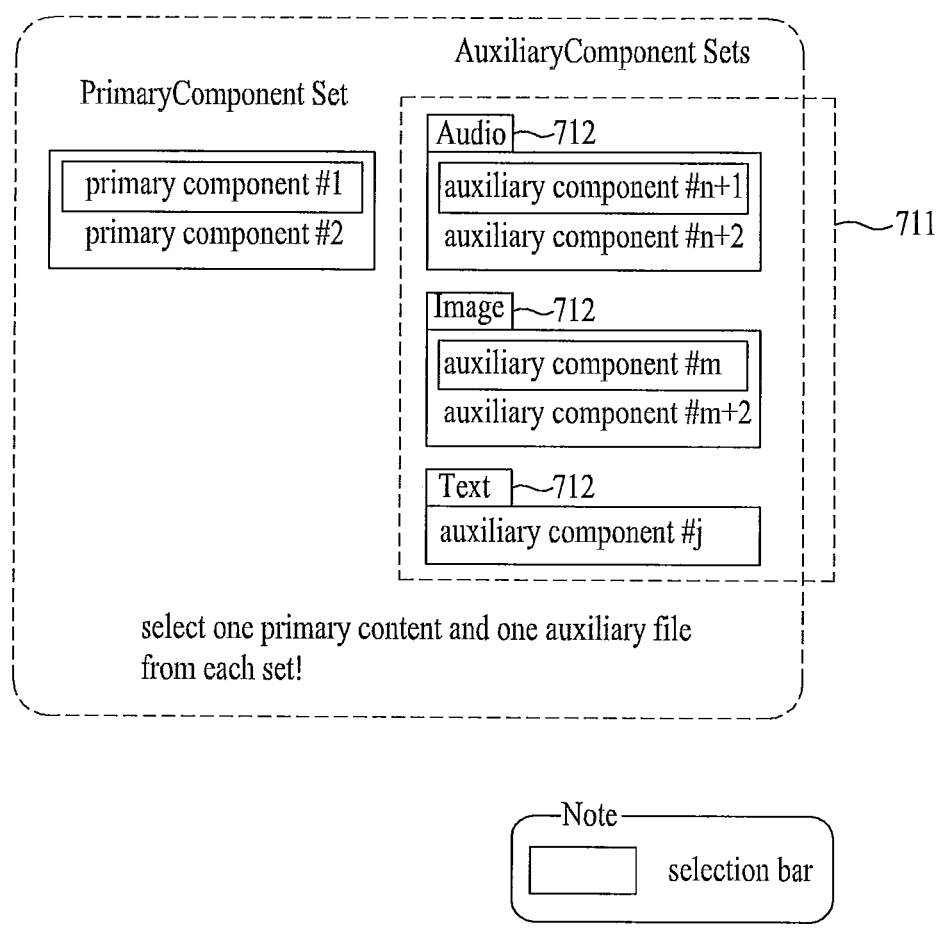

An auxiliary component can have various attributes. For example, audio, text, image, or a selected combination thereof can be the attributes of an auxiliary component. As shown in FIG. 7B, if the number of attributes of an auxiliary component is more than two, a selection set 711 according to each attribute is displayed and one auxiliary component is selected from the selection set. As shown in FIG. 7B, when multiple selection sets are displayed for the user, information about the attribute of each set (e.g., audio or text) may be displayed together at the top of each selection set 712. Information required for the display as shown in FIG. 7B may be obtained from a property parameter being defined by the CDS 221. Alternatively, information required for the display as shown in FIG. 7B may be obtained from protocol information defined by resource tag (<res>) in FIG. 5.

Figure 5:
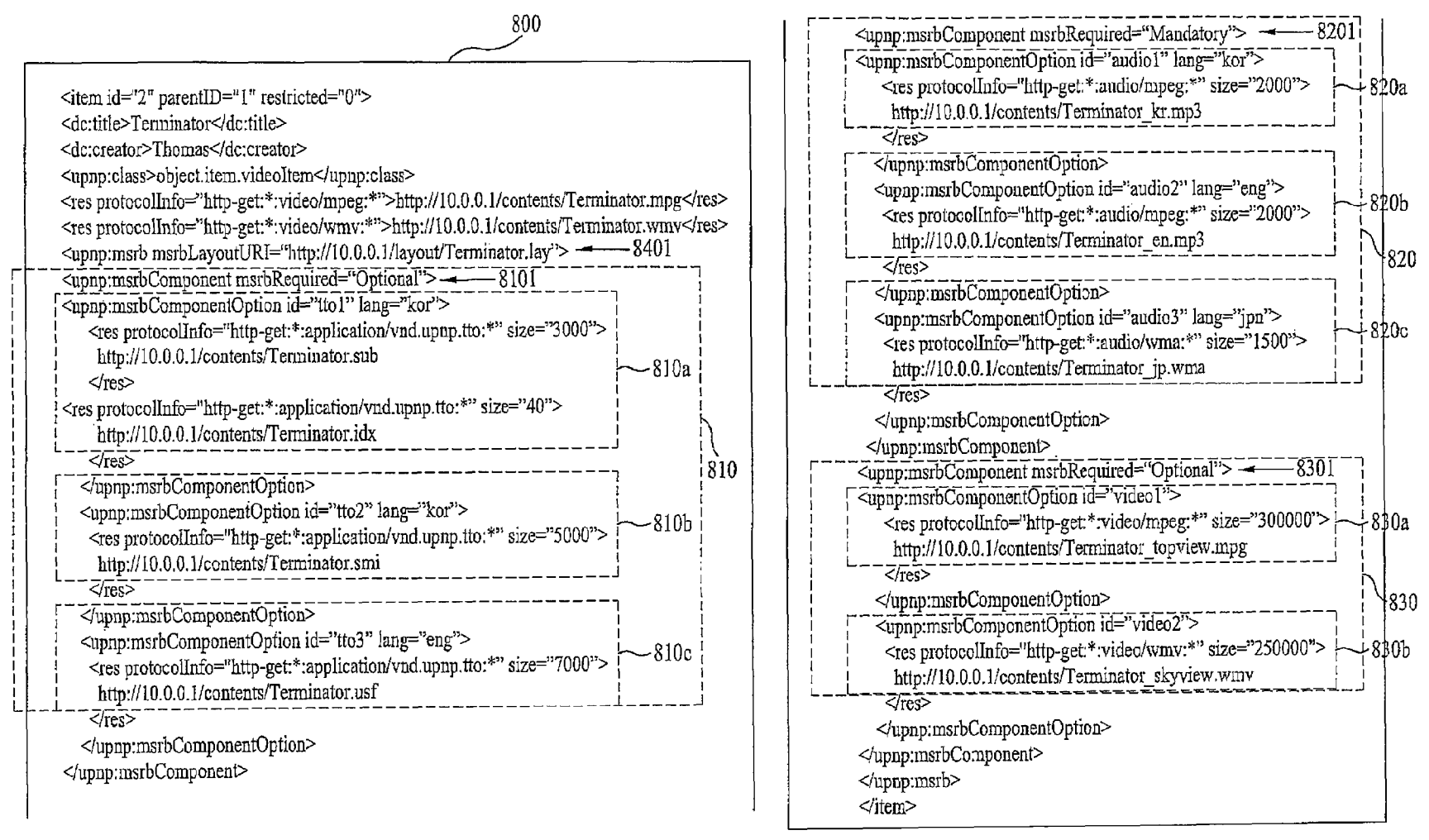

When a user is requested to select a content source to play from a content set, the user may not perform specific selection about a component within a content source selected for multi-content streaming. In this case, the CP 210 may select a component to be streamed within each of selected content sources by using a default method. For example, the CP 210, if specific selection is not carried out for a component within each selected component source, a resource specified by a first front <res> tag within each <msrbComponent> tag as illustrated in FIG. 5 can be selected as a streaming component.

According to the procedure above, when selection of a content source within a content set and selection of a main component and an auxiliary component for each content source are completed, the CP 210 obtains from associated structure elements protocol information and URL information about a selected component belonging to each content source. That is, in the item information illustrated in FIG. 5, the CP 210 obtains the protocol and URL information from information of <res> tag of each selected component.

If protocol information of a component obtained from the above procedure is not compliant with the protocol supported by the media renderer A 230 (which is destined by the user for a device for presentation), the corresponding component is ignored and operations for presentation at the media renderer A 230 described below are not carried out for the component. Instead, the user may receive an alarm message saying "The selected component cannot be played at the destined media renderer!"

The embodiment of FIG. 3 further includes a checking multi-streaming capability of the media renderer A 230 (S31-1) after performing the browse and search actions (S31). As a matter of convenience, the embodiment introduces new defined concept of Multi-Streaming Resource Bundle (hereinafter it is called simply 'MSRB' or 'msrb').

The purpose of using MSRB structure is to put associated resources together so the CP can select associated resource(s) and can bundle each selected resource together. Without an MSRB structure, the CP can select multiple resources various ways but it does not guarantee that the user select correct one which is tightly associated with the primary item located in somewhere in CDS. Therefore, this structure is used to expose correct information of the possible resources to support multi-streaming. The multi-streaming structure stems from an item which is associated with other resources. The resource of this item is primary and the associated resources are secondary. The primary resource can be any type of streaming resource such as video, audio. When the primary item has capability of multi-streaming, it has an exposing structure to describe multi-streaming which can be called as MSRB (Multi-streaming Resource Bundle).

Figure 4:
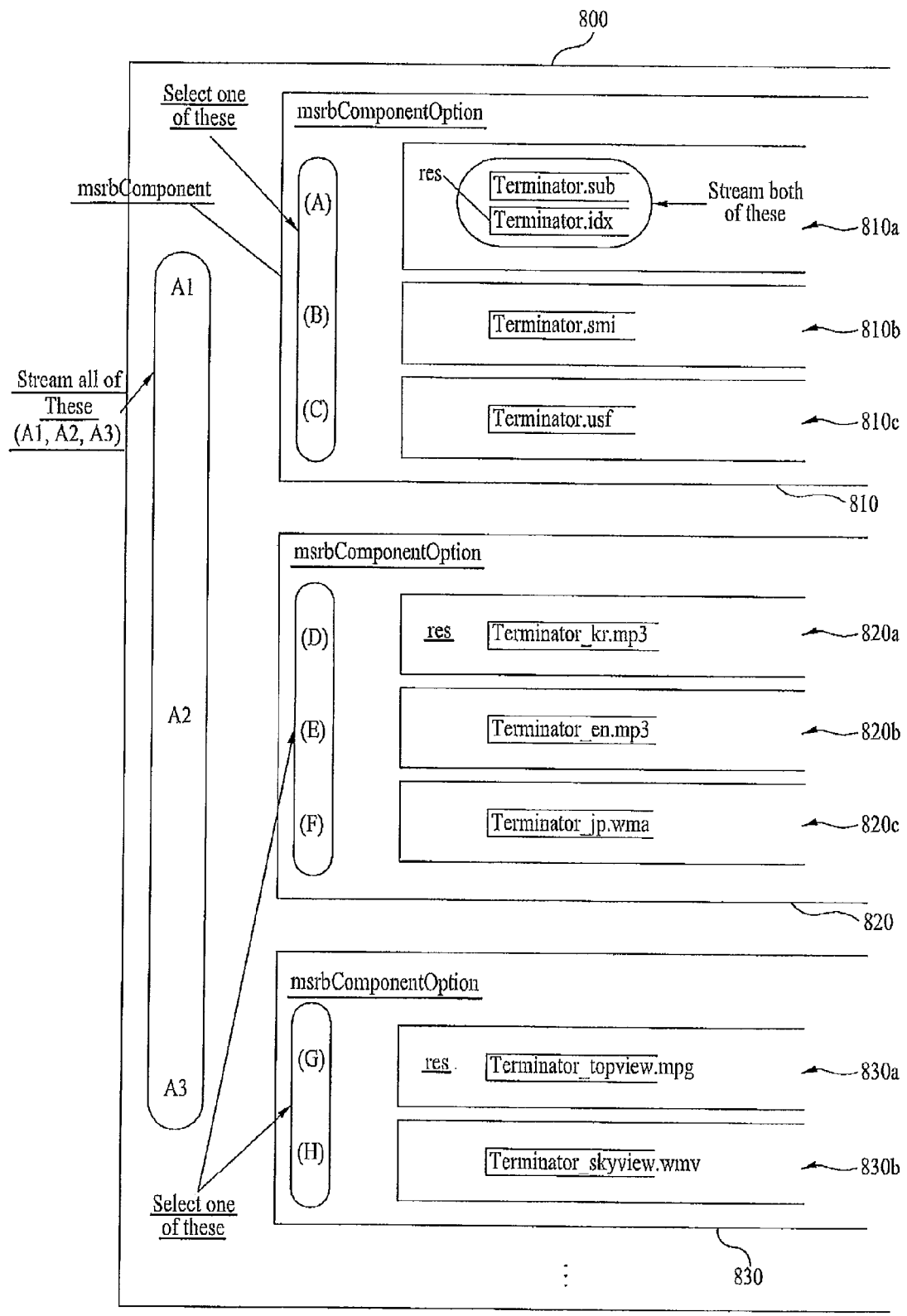
FIG. 4 illustrates a diagram showing a structure of multi-streaming contents according to an embodiment of the present invention.

FIG. 4 illustrates an example diagram of the MSRB structure. And FIG. 5 illustrates an example XML program according to the MSRB structure of FIG. 4.

The element of 'MSRB' 800 is main body of multi-streaming structure which is composed of one or more msrbComponent, for example A1 (810), A2 (820), and A3 (830). All mandatory msrbComponents shall be included in the bundle but all optional msrbComponents may be included in the bundle. Therefore, 'msrbRequired' (8101, 8201, 8301 of FIG. 5) is introduced to indicate whether the corresponding msrbComponent is mandatory or optional. Each of msrbComponents (810, 820, 830) is composed of one or more 'msrbComponentOption(s)'. For example, the first msrbComponent A1 (810) may include three msrbComponentOptions A (810*a*), B (810*b*), and C (810*c*). The second msrbComponent A2 (820) may include three msrbComponentOptions D (820*a*), E (820*b*), and F (820*c*). And, the third msrbComponent A3 (830) may include two msrbComponentOptions G (830*a*) and H (830*b*). Furthermore, 'msrbLayoutURI' (8401) indicates the URI of layout for rendering multiple resources in a pre-defined manner.

If there is an item which can support multi-streaming capability, the result of CDS browse( ) action should have MSRB structure. And the CP should know about supported combination of msrbComponentOption in the MSRB structure. To realize this kind of mechanism we need to define a new action to check the capability of renderer side. The proposed new action can be defined as 'CheckMsrbCapability( )', for example the step S31-1 of FIG. 3.

This action of 'CheckMsrbCapability( )' queries about capability of renderer for multi-streaming. The input arguments for this action should be a restructured MSRB structure (910 in FIG. 8A) which includes primary resource information because the renderer should have to know about not only original MSRB structure but also primary resource information. The results can be a filtered MSRB structure (920 in FIG. 8A) which is composed of possible combination of msrbComponentOption of restructured MSRB structure.

Figure 8B:
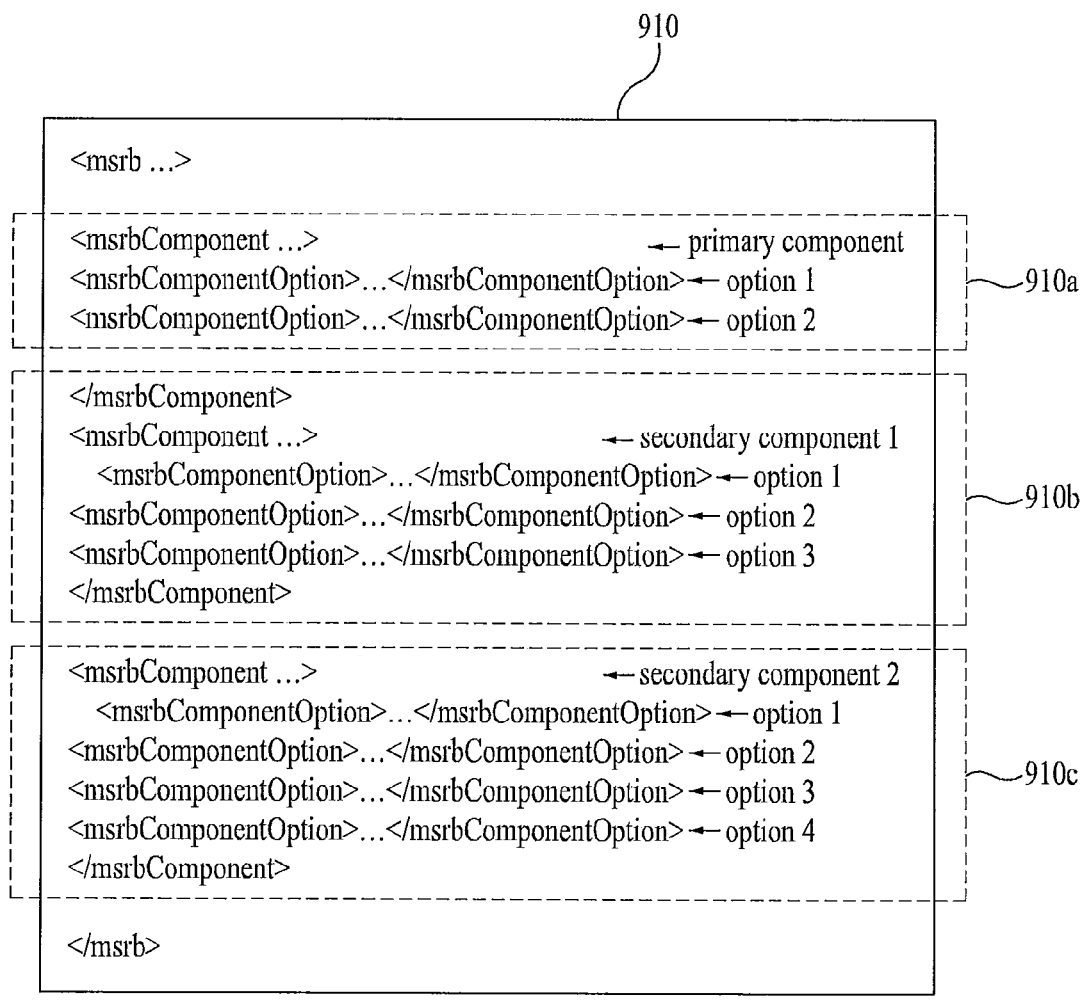
FIGS. 8B and 8C respectively illustrate a structure of request action and a structure of response action in association with the multi stream capability according to an embodiment of the present invention.
Figure 8C:
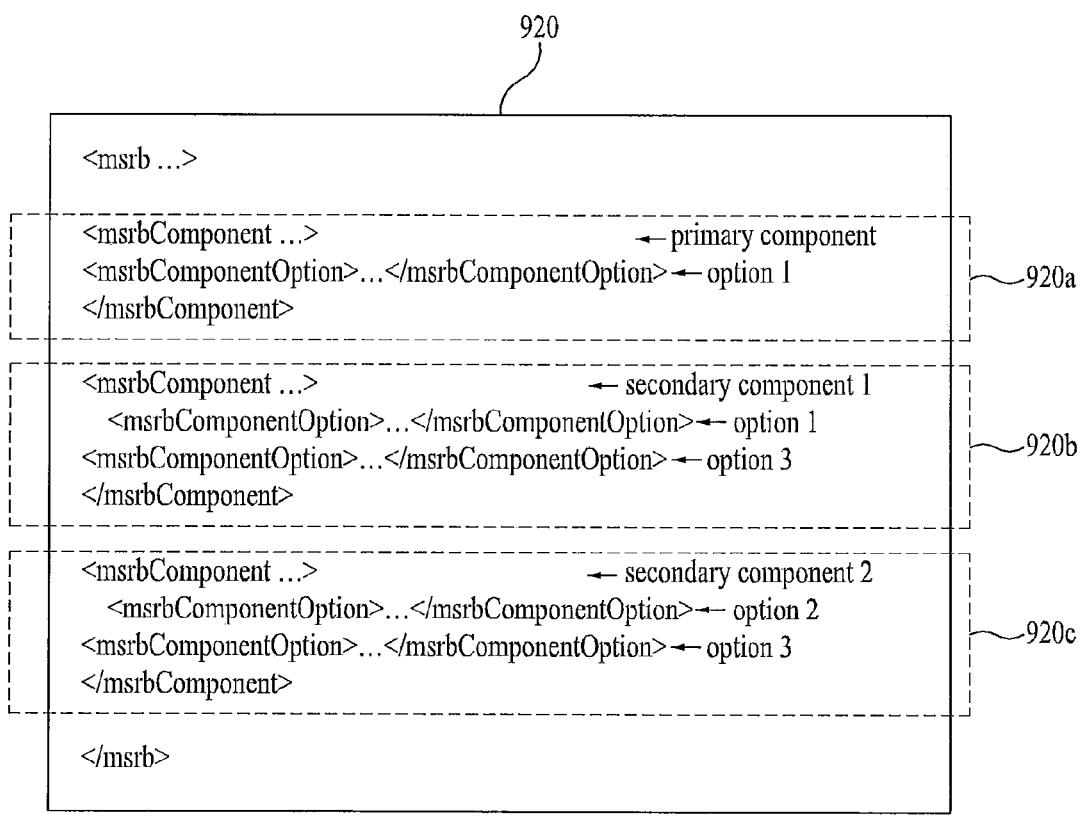

With regard to 'CheckMsrbCapability( )' action, FIG. 8B is the example format of input argument as restructured MSRB structure and FIG. 8C is the example format of output argument as filtered MSRB structure.

Referring back to the FIG. 3, the CP 210 transmits the input argument as restructured MSRB structure 910 of 'CheckMsrbCapability( )' action S31-1 to a media renderer 230 to determine the multi-streaming capability of the media renderer 230. Referring to the FIG. 8B, the input argument as restructured MSRB structure 910 may include all primary component (910*a*) and secondary components (910*b*, 910*c*) included in the MSRB structure. Referring to the FIG. 8C, in response to the input argument of restructured MSRB structure 910, the media renderer 230 may transmits the output argument as filtered MSRB structure 920 which includes possible combination of msrbComponentOption(s) (920*a*, 920*b*, 920*c*) to the CP 210.

If multi-streaming capability (S31-1) and user's content selection (S32-1, S32-2, S32-3) are completed, it is necessary to communicate with a media server 220 to receive selected content data. An embodiment of the present invention, connections for respective components are grouped and multi-streaming is carried out for a content set by using an identifier for the grouped connections (hereinafter, it is called 'group connection').

Current UPnP architecture has two kinds of method to support multiple streaming. One is using multiple embedded device of UPnP Device Architecture and the other one is using multiple virtual instances for variable number of resources. If designer wants to design a device supporting multiple streaming, using multiple virtual instances would be better than other because different number of resource can be used to support multiple streaming.

When a user selects one Item in CDS, there is a set of other choices for user so that user can select appropriate resource from msrbComponent and can receive an appropriate content together from server. In this case, a CP (control point) can select multiple resources so it is possible for the CP to invoke actions for the multiple resources as long as it has related IDs. There can be two possible methods to handle multiple resources at the same time. One is making an action to be able to get multiple instances as an input argument and the other one is making a group instance ID to handle multiple resources together. The first one should have to develop multiple actions because current action has only one instance ID as input argument but the second one only needs to develop actions to control group instance ID. For the purpose of making fewer actions, using group instance ID is better. Therefore, new actions for create, control, and remove group instance ID is needed.

FIG. 10A illustrates a table showing relationship between Group IDs and Individual IDs and FIG. 10B illustrates a table showing required actions to handle Group IDs.

The action of PrepareForGroupConnection( ) 1011 will return Group IDs 1001 including GroupConnectionID 1001*a*, GroupAVTID 1001*b*, and GroupRCSID 1001*c*. From now on, GroupConnectionID 1001*a* will be used as a representative ID of Group (simply, GID). The GID 1001*a* can be used for grouping of each associated individual IDs 1002 or sub IDs including Primary ID and Secondary IDs 1002*a*. The actions required for grouping is adding to group and removing from group. The action of AddToGroup( ) 1012 and RemoveFromGroup( ) 1013 will be used for adding and removing. Even though newly created actions use GID, it is necessary for a CP (control point) to invoke multiple Prepare- ForConnection( ) to make each connections. The information about how many resources are needed is obtained by a media server. And AVTransport Service and RenderingControl Service actions will use virtual instances to handle resources respectively. If each resources need to be treated as a group, then GID can be generated by PrepareForGroupConnection( ) and it can be ready at least just before a CP (control point) adds each virtual instance ConnectionIDs to GID. To get current GIDs and information about that, GetGroupIDs( ) 1014 and GetGroupInfo( ) 1015 action is needed. GetGroupIDs( ) 1014 returns all of current GID and GetGroupInfo( ) 1015 returns GroupAVTID and GroupRCSID. To get which one is primary and which one is secondary, GetGroupIDInfo( ) 1016 actions is needed which returns individual primary and secondary ConnectionIDs.

Referring back to the FIG. 3, the CP 210 invokes an action for preparing group connection (PrepareForGroupConnection( ) (S93-1, S93-2) on each Connection Manager (CM) service 222, 232 of a media server 220 and a media renderer A 230.

Since the action for preparing group connection has the same structure illustrated in FIGS. 10A and 10B, group connection information, for example a virtual instance ID is received in response to the invocation from the media server 220 and the media renderer A 230 being carried by output arguments. The virtual instance ID represents an instance ID not corresponding to an actual connection; the virtual instance ID is treated as a virtual ID for identifying a group connection.

Figure 9:
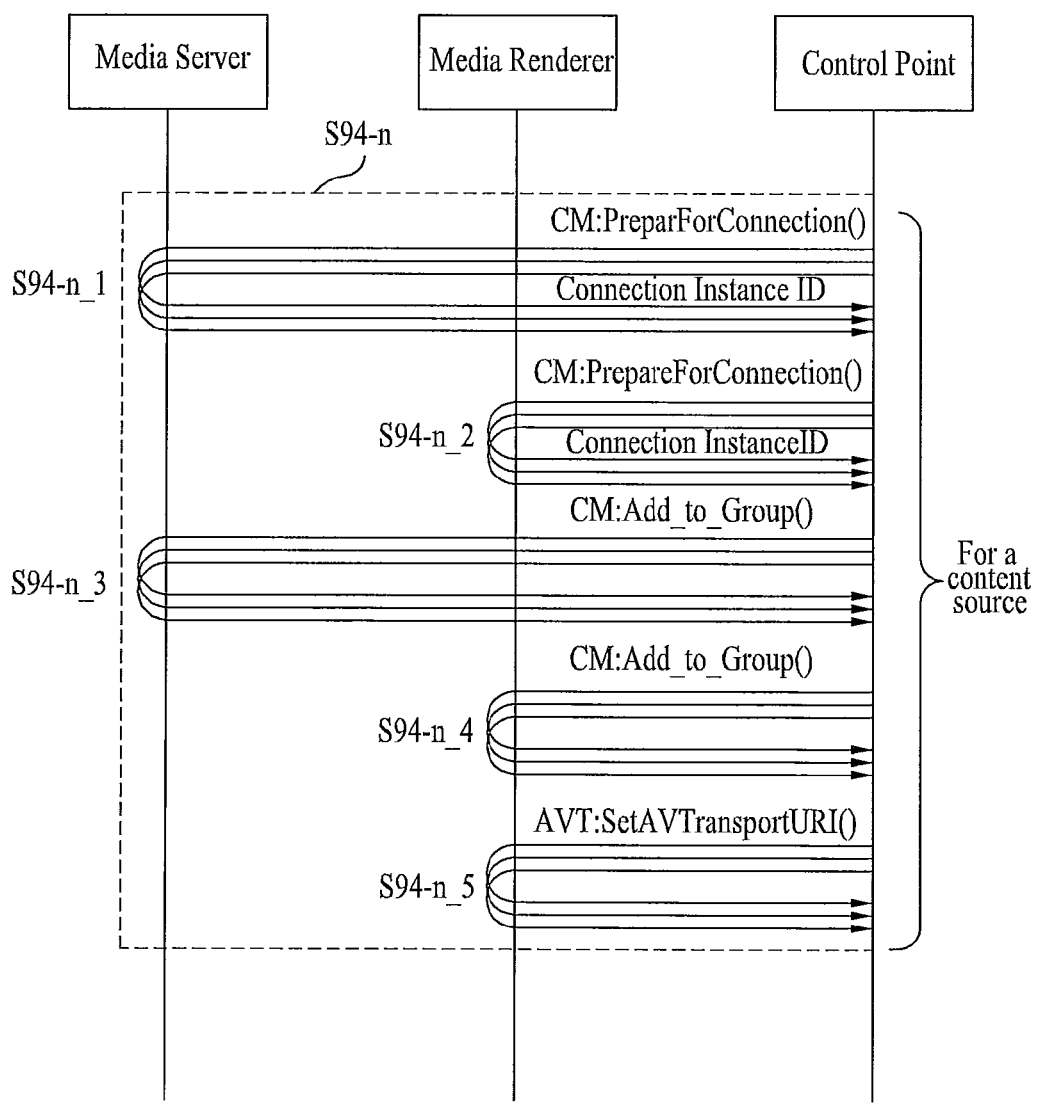
FIG. 9 illustrates a signal flow between devices and/or services for multi-streaming contents according to an embodiment of the present invention.

The CP 210 carries out an operation for preparing multi-streaming to be applied to a content source where protocol information and URL information of each of constituting components have been identified (S94-$n$, $n=1, 2, \ldots$ ). The signal processing example of FIG. 3 describes a case where three content sources X, Y, Z within a content set are selected and three identical preparation operations (S94-1, S94-2, S94-3) are carried out between devices and/or services. Specific description about actions carried out during each preparation operation is illustrated in FIG. 9. As shown in FIG. 9, an action is carried out for each component belonging to a single content source and since input arguments of each action are prepared for the corresponding component, the input arguments have mutually different information that is adequate to and associated with the component. Signal processing between devices and/or services illustrated in FIG. 9 is described specifically.

The CP 210 invokes connection preparation actions (PrepareForConnection( ) for individual connection which is intended to represent a connection created for a single component in contrast with 'group connection', namely for each component to the media server 220 and the media renderer A 230 respectively and receives an instance ID assigned by participating services to be involved in presentation through streaming between devices (S94-$n$_1, S94-$n$_2). The example of FIG. 9 assumes that three components from a single content source are selected and presented in synchronization with each other, displaying a signal line representing a single action overlapped three times.

When the CP 210 receives an instance ID of each participating service (CM, AVT, or RCS) about individual connection of each component through an action for preparing connection, the CP 210, to group received instance IDs about individual connection, invokes an action for adding to a group (AddtoGroup( )) having the structure illustrated in FIG. 10B as many times as the number of individual connections (S94-$n$_3, S94-$n$_4). The action for adding to a group is for linking an instance ID for individual connection with an instance ID (a virtual instance ID assigned for identifying the group connection) for group connection received through the previous action (S93-1, S93-2) for preparing group connection. At this time, input argument of each action for adding to a group includes a GroupID (GID) and a connectionID for individual connection to be enlisted in the group connection of the GroupID (GID).

Although a connection preparation action for individual connection is invoked for each component (S94-$n$_1, S94-$n$_2) after a group connection preparation action for group connection has been invoked (593-1, S93-2) in the embodiment of FIG. 3, invocation of the action can be carried out in a reverse order. In other words, it is sufficient that a connection instance ID for individual connection to be added to a group and a connection instance ID for a group connection are prepared before carrying out the action for adding to group, if a group connection preparation action and a connection preparation action for individual connection is carried out irrespective of the order.

After receiving an action for linking the instance ID, The CM service 222 or 232 constructs management information for mapping an instance ID for group connection contained in each group addition action onto an instance ID for individual connection. In addition to the mapping information about instance IDs, if there exists additional information received through input arguments of an action for preparing group connection and an action for adding to group (for example, information about whether an individual connection is a main or an auxiliary component, and the like), the received information is also stored as management information and thus managed by the CM service 222 or 232.

After construction of mapping information, each CM service 222, 232, in response to the request of the CP 210 for playback management or rendering control utilizing an instance ID of a connection group, identifies an instance ID of individual connection corresponding to a service requested for an action and utilizes the instance ID, thereby specifying the corresponding resources available.

In the embodiment described above, if an instance ID is received by some action before all of required instance IDs of each connection are received by individual connection preparation actions applied to selected components, the CP 210 can immediately carry out an action (AddtoGroup( )) for joining the corresponding connection to a group connection established by the previous group connection preparation action. In other words, performance of an action for adding to group (AddtoGroup( )) applied to an individual connection can be carried out irrespective of reception of a response to a connection preparation action (PrepareForConnection( )) of other connections once an instance ID of the individual connection is received.

After grouping individual connections by using the above operations, for each component within the previously selected content source, an action for setting access location information about the component (e.g., URL information) to AVTransport service 233 (SetAVTransportURI( )) is invoked (S94_$n$_5).

After completing operations for preparing playback of individual content source selected within a content set (after completion of the operation S94-3 in the example of FIG. 3), the CP 210 invokes a playback action on AVTransport service 233. The action uses a previously received instance ID of AVTransport service for group connection (S95). The instance ID of AVTransport service for group connection transferred by the action is mapped onto instance IDs of AVTransport service for individual connection by CM service 232 and the mapped instance IDs are transferred to AVTransport service 233, enabling playback operations of individual connections to start at the same time. Next, through a relevant information exchange procedure between the media renderer A 230 and the media server 220, components of a content source selected within a content set are all streamed or downloaded from the media server 220 and are decoded and outputted by the rendering module 231*a* under control of RenderingControl service 231 (S96). At this time, those components 901 requiring synchronized playback between components within a content source are presented in synchronization with each other.

As described above, the user can request presentation of content sources within a content set to be played through separate multiple media renderers or the user can request presentation of components belonging to content sources by using a different media renderer according to attributes of the components. In this case, the CP 210 dose not establish a group connection for all the components in a content set to be presented but establishes a group connection by components that are directed to the same device.

Figure 11:
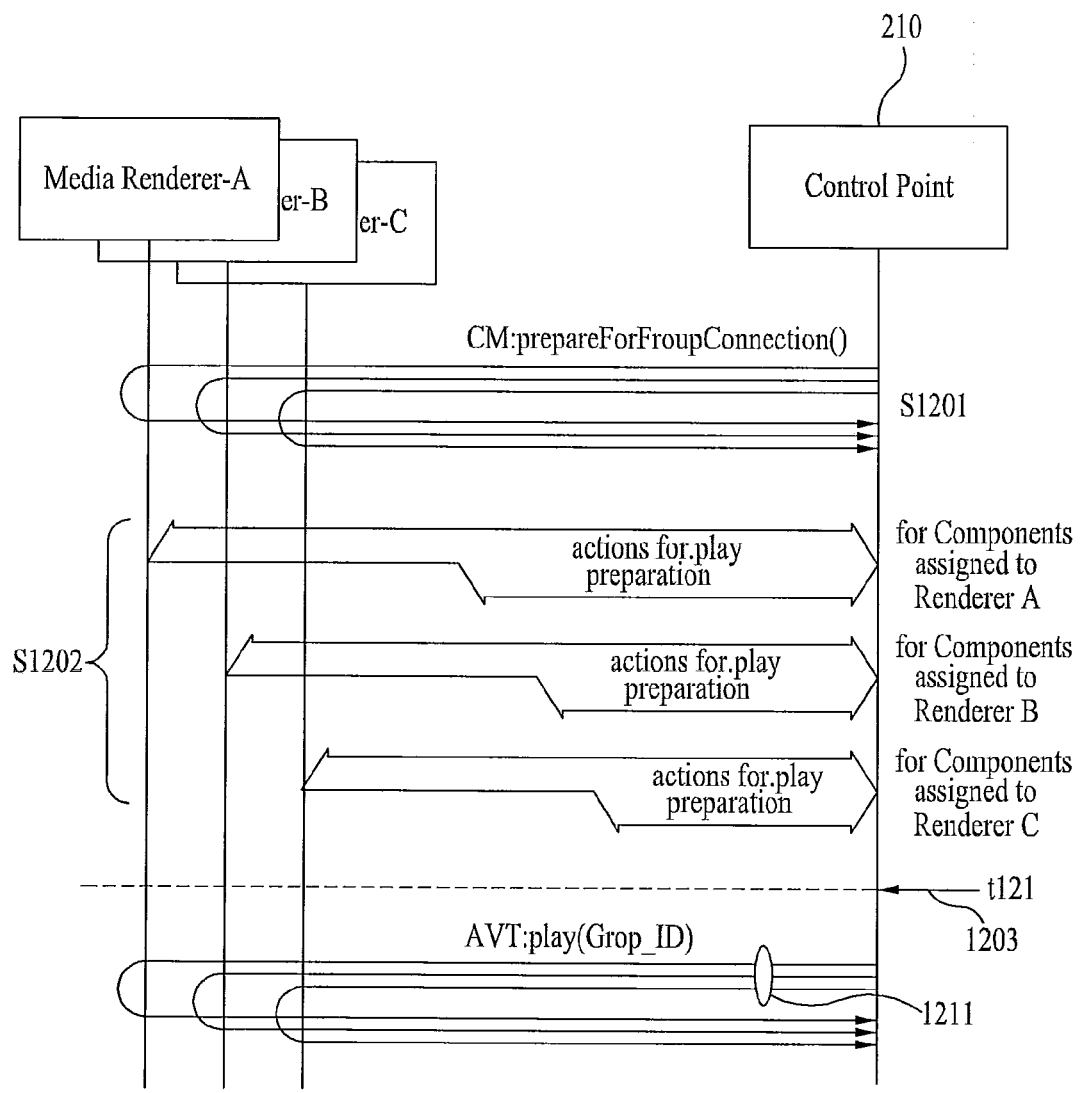
FIG. 11 illustrates a signal flow between devices and/or services for playing resources belonging to multiple content sources by assigning the resources to multiple media renderers and utilizing group connection information according to an embodiment of the present invention.

FIG. 11 illustrates signal processing for playback using group connection information based on the assumption that components are designated for presentation being distributed across media renderers A, B, and C. As shown in the FIG. 11, an action for preparing group connection is invoked for each group of components directed to each media renderer (S 1201) and operations for preparing multi-streaming are carried out by using an instance ID of a group connection received from CM service of each media renderer (S 1202). After operations for preparing playback of components selected within a content set have been completed (in the example of FIG. 11, after t121 at which a success response to the last action has been received), the CP 210 invokes playback actions using an instance ID of a group connection to respective AVTransport services of the media renderers A, B, C. In this case, it is desirable that invocation 1211 of playback actions using an instance ID of a group connection upon media renderers should be carried out simultaneously.

While operations of presentation being carried out according to the above procedure S35, S96, if a request for controlling a playback operation with respect to particular content or components (playback stop, temporary stop, search, trick play, etc) or a request for changing rendering state (adjustment of volume, stopping audio output, adjustment of brightness, etc) is made by the user, the CP 210 requests the corresponding action (e.g., AVT:Stop( ), AVT:Pause( ) PCS:SetVolume( ), RCS:SetMute( ) etc) from a media renderer. In response to the request, an instance ID for a group connection assigned to multi-streaming in service or an instance ID for an individual connection can be employed. For the case of using an instance ID for an individual connection, since a device or a service invoked by an action can immediately recognize a connection corresponding to the instance ID and resources assigned to the connection, operations requested by an action with respect to the connection or resources are carried out.

In case of using an instance ID for a group connection, a service which receives an action maps the instance ID for an individual connection directly onto the instance ID of the corresponding group connection and carries out operations for a individual connection of the instance ID, for example control operations. For instance, when individual connections corresponding respectively to the components of video, audio, and text attribute are set up as a group connection and a SetVolume( ) action that adjusts loudness of sound has been received through an instance ID of the group connection, the instance ID of the group ID can be directly mapped onto the instance ID of a connection set up for a component of audio attribute from among instance IDs for the three individual connections.

When the above mapping is inappropriate (for example, a group connection comprises multiple components of the same attribute or a group connection is set up for two or more content sources within a content set as illustrated in the previous example) and a particular action is invoked, an instance ID for an individual connection within a group connection is retrieved and used, which is described in the following. By grouping individual connections through a procedure as described above and delivering required information to a related service through an action, the user can select a desired one from among grouped individual connections and carry out inquiring about or controlling the connection through the CP 210 that created the corresponding group connection or through a different CP that has newly participated in the network.

Figure 12:
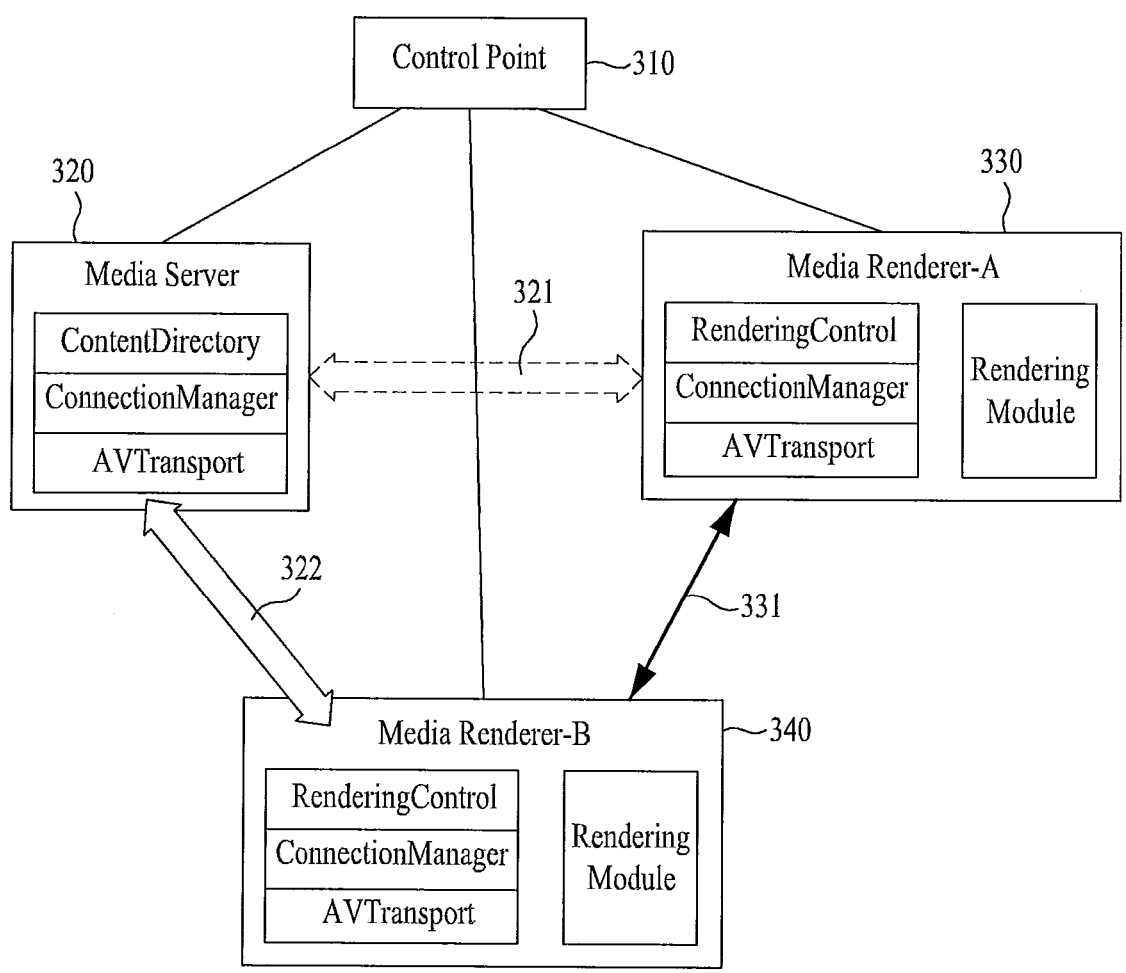
FIG. 12 illustrates changing media renderers in example of UPnP AV network according to an embodiment of the present invention.

FIG. 12 illustrates an embodiment of changing media renderers in example of UPnP AV network according to the present invention. Compared to the illustrated embodiment of FIG. 3, the exemplary embodiment of FIG. 12 may become a specific exemplary of FIG. 3 in view of changing media renderers during playback of multi-streaming contents. For instance, during a user performs a payback of multi-streaming contents using media renderer A 330 (e.g., mobile phone), the user wishes to change media renderers form renderer A 330 (e.g., mobile phone) to renderer B 340 (e.g., DTV) for performing playback of multi-streaming contents to be presented on more larger size of display screen or high quality audio system or a different captioned text language.

In other words, the previous playback (321) of multi-streaming contents is changed to new current playback (322) of multi-streaming contents in a different device, with a seamless streaming condition. Consequently, the playback position in a previous playback device (renderer A) can be seamlessly transferred to the current playback device (renderer B).

Figure 13A:
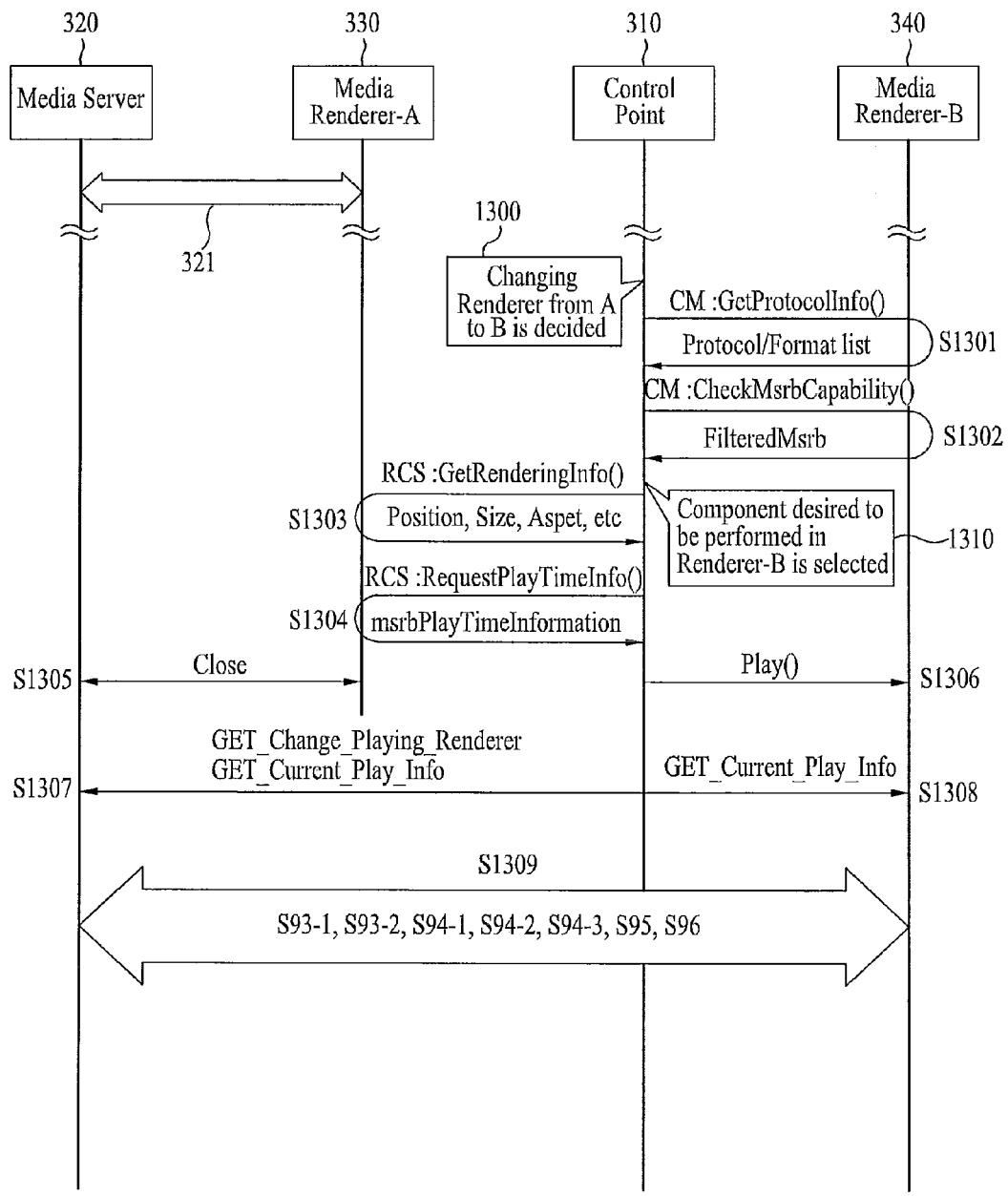
FIGS. 13A and 13B respectively illustrate a signal flow for changing media renderers in example of UPnP AV network according to an embodiment of the present invention.
Figure 13B:
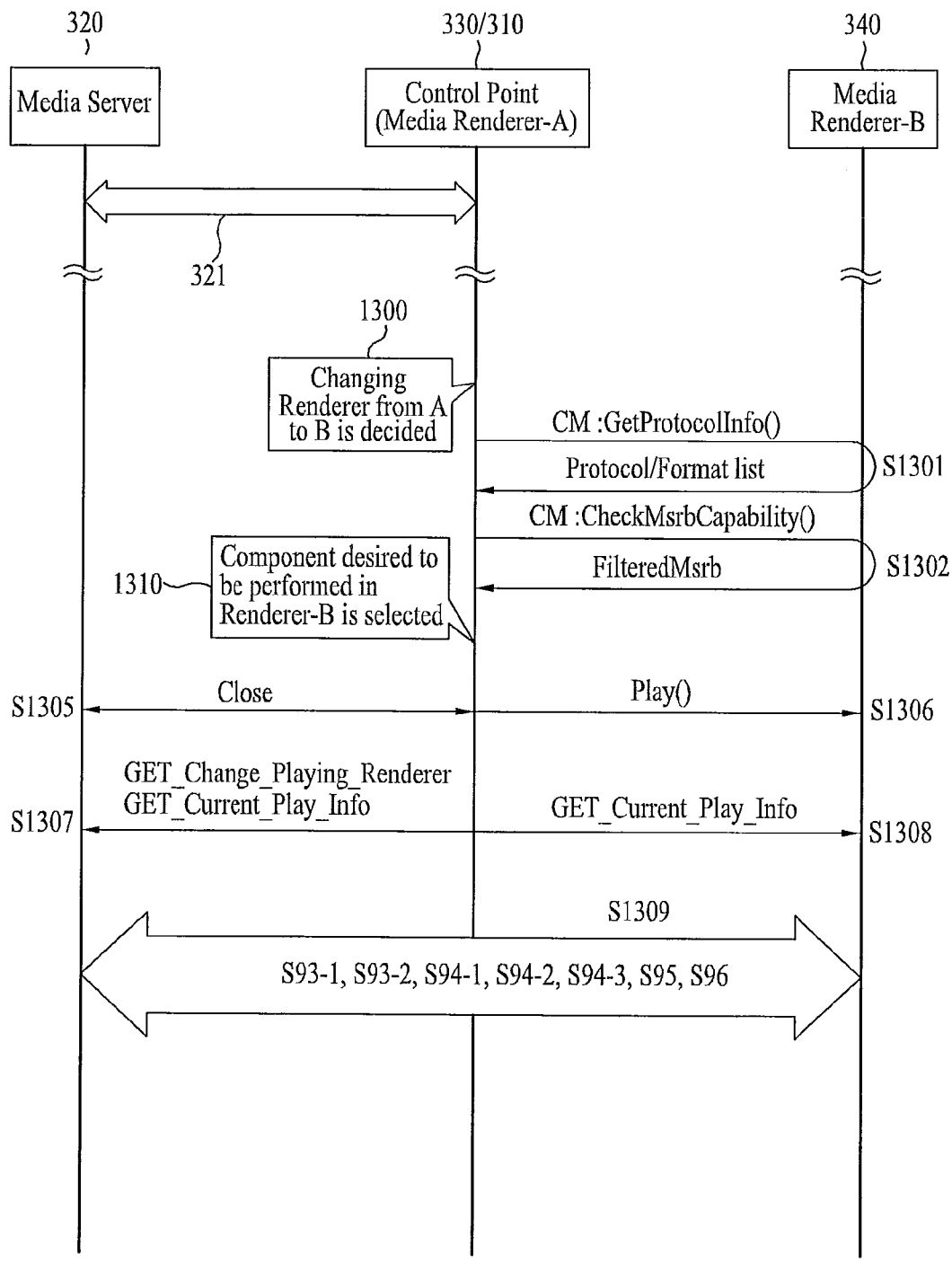

FIGS. 13A and 13B respectively illustrate a signal flow for changing media renderers in example of UPnP AV network according to the embodiment of FIG. 12. Specifically, FIG. 13A is an exemplary embodiment that the UPnP network includes physically separated a CP 310 and a renderer A 330 which is performing playback of multi-streaming contents. In contrast, FIG. 13B is an exemplary embodiment that the UPnP network includes a device which has both operation function of a renderer A 330 and a CP together. That is, in FIG. 13B, the CP and the renderer A belong to the same device.

Referring to the FIG. 13A, before changing renderers is decided (1300), it assumes that a playback of the multi-streaming contents between the media server 320 and the media renderer A 330 was performed (321). The changing renderers can be decided by either a user's selection or pre-determined programmed system's behavior.

When changing renderers is decided (1300), for example changing from renderer A 330 to renderer B 340, a CP 310 first starts an initial communication with the new renderer B 340 to check a display format and multi-streaming capability of the renderer B. That is, the CP 310 invokes actions of GetProtocolInfo( ) S1301 and CheckMsrbCapability( ) S1302 to the renderer B 340. The detailed actions of GetProtocolInfo( ) S1301 and CheckMsrbCapability( ) S1302 are similar operation S30 and S31-1 of FIG. 3, respectively. The detailed disclosure of these actions will be omitted.

After receiving a response of actions S1301 and S1302 from the renderer B, the CP 310 display a UI screen for user to select (or determine) component of contents desired to be performed playback in the renderer B 340 (1310), by comparing the multi-streaming capability of the renderer B 340 with streaming content information performed playback in the renderer A 330. With regard to the selection of contents, FIGS. 14A~14C and 15A~15C respectively illustrate the exemplary UI screen provided in the CP.

Figure 14A:
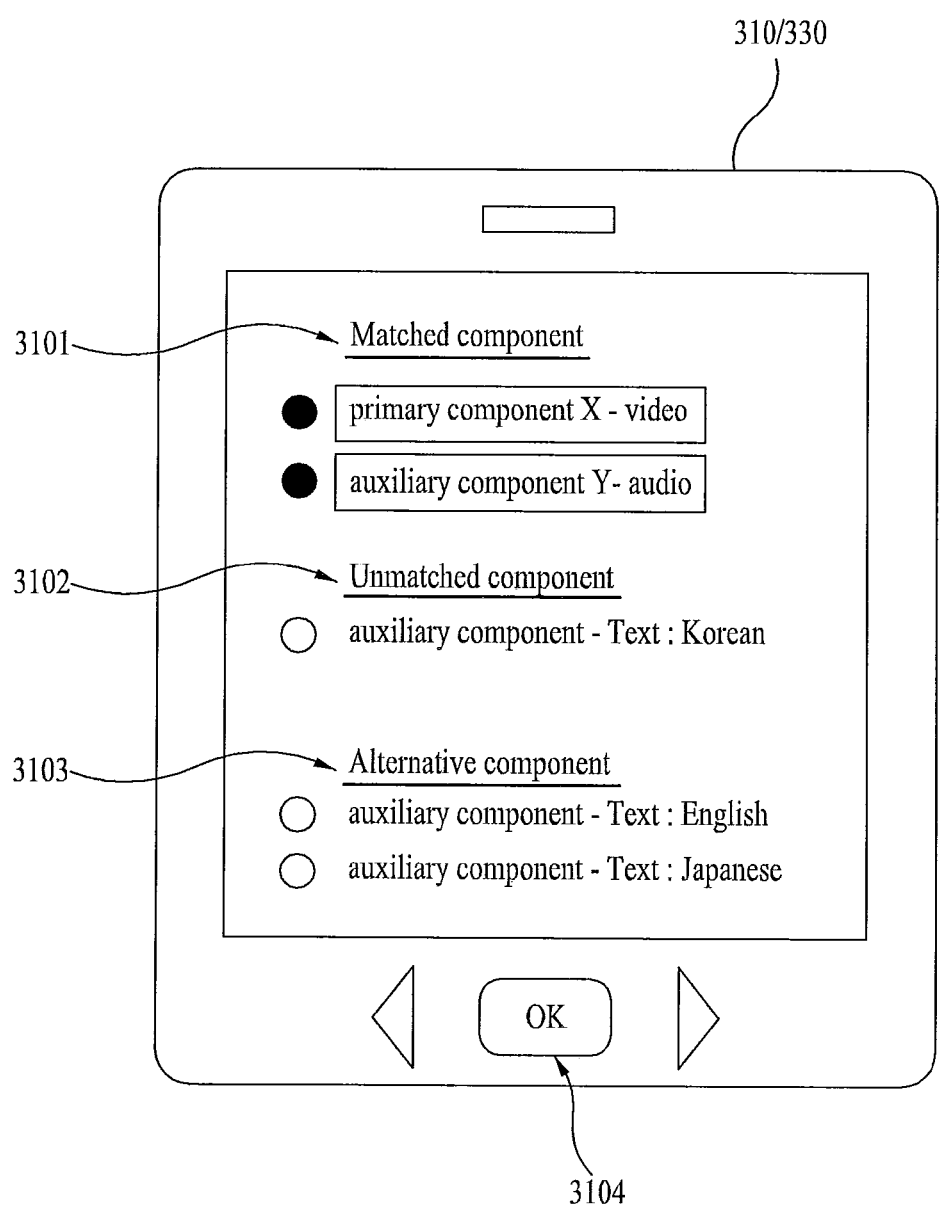
FIGS. 14A~15C illustrate examples of a screen according to an embodiment of the present invention, the screen providing an input interface for the user to select a desired component to be performed at the changed renderer.
Figure 14B:
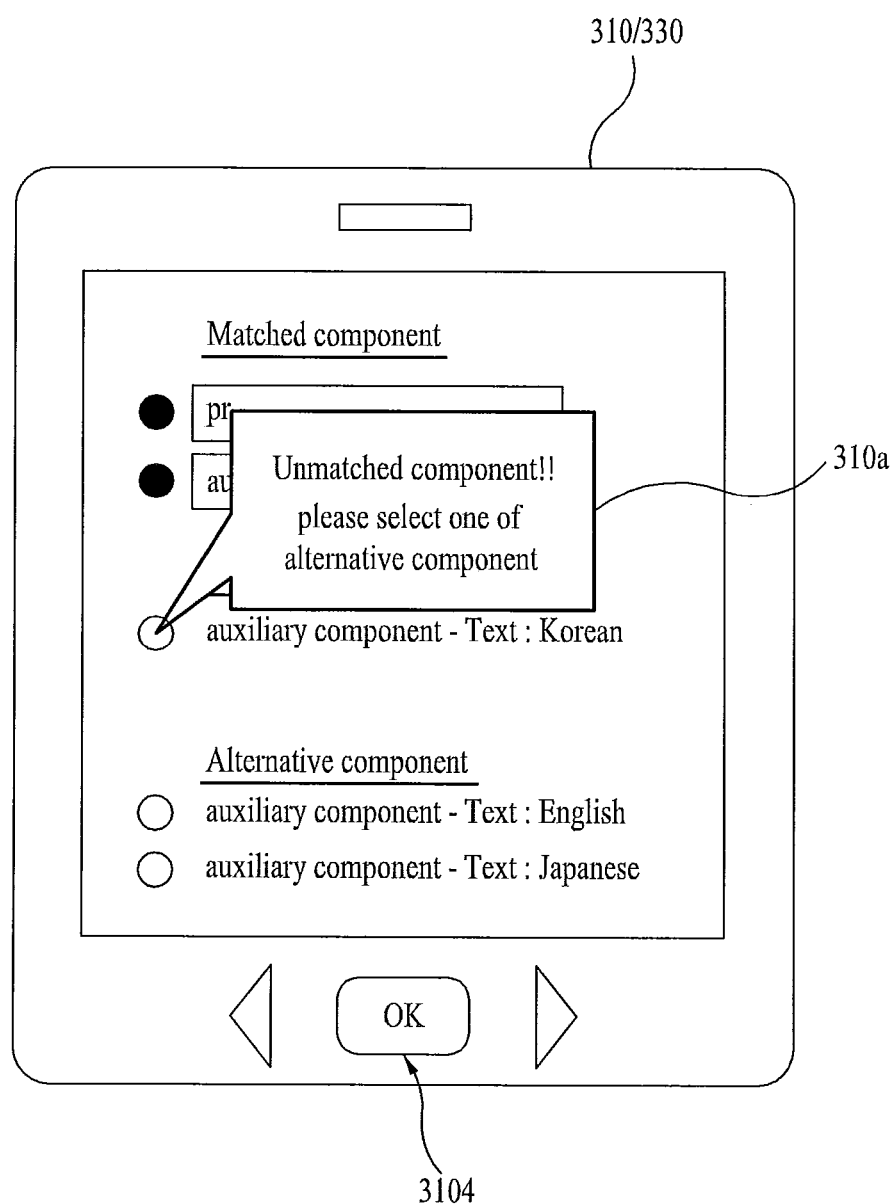
Figure 14C:
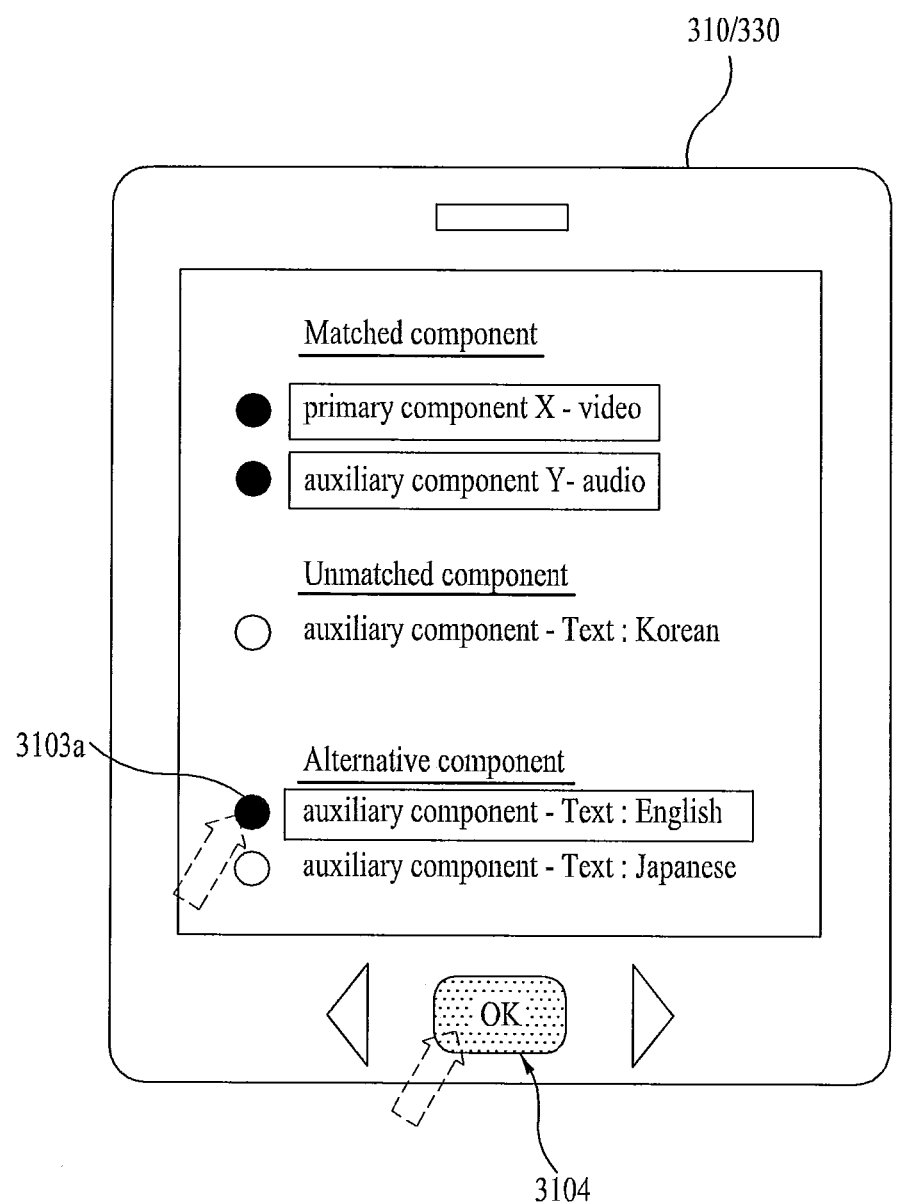

Normally, the selected content to be transferred to a current renderer (e.g., renderer B) may be same content of which was performed playback at a previous renderer (e.g., renderer A). However, a difference selection can be generated on a specific event. For instance, one example event is the current renderer (e.g., renderer B) being incapable of playback of specific content of which was already performed playback at the previous renderer (e.g., renderer A). Other example event is that although the current renderer (e.g., renderer B) being capable of playback of all content of which was already performed playback at the previous renderer (e.g., renderer A), the user wishes to change to any different content within same attribute of previous content. FIGS. 14A~14C belongs to a first (former) example and FIGS. 15A~15C belongs to a second (latter) example.

FIGS. 14A~14C illustrate a first example of a UI screen according to the present embodiment. For instance, the UI screen of CP provides three areas as like a matched component area 3101, an unmatched component area 3102, and an alternative component area 3103, shown in FIG. 14A. The matched component area 3101 provides one or more components of content which was already performed playback at the previous renderer (e.g., renderer A) and also performable at the current renderer (e.g., renderer B). The unmatched component area 3102 provides one or more components of content which was already performed playback at the previous renderer (e.g., renderer A) but not performable at the current renderer (e.g., renderer B). The alternative component area 3103 provides one or more components of content which was (or was not) performed playback at the previous renderer (e.g., renderer A) but performable at current renderer (e.g., renderer B) as an alternative of any component of content provided in the area 3101 or 3102.

Referring to the FIG. 14B, if the unmatched component area 3102 provides at least one component (e.g., auxiliary component—Text Korean), the UI screen instantly provides a pop-up window 310*a* warning a message as like 'Unmatched Component, please select one of alternative component'. As the warning message, a user can easily select one of alternative component (e.g., auxiliary component—Text English 3103*a*) in an alternative component area 3103 as shown in FIG. 14C.

Figure 15A:
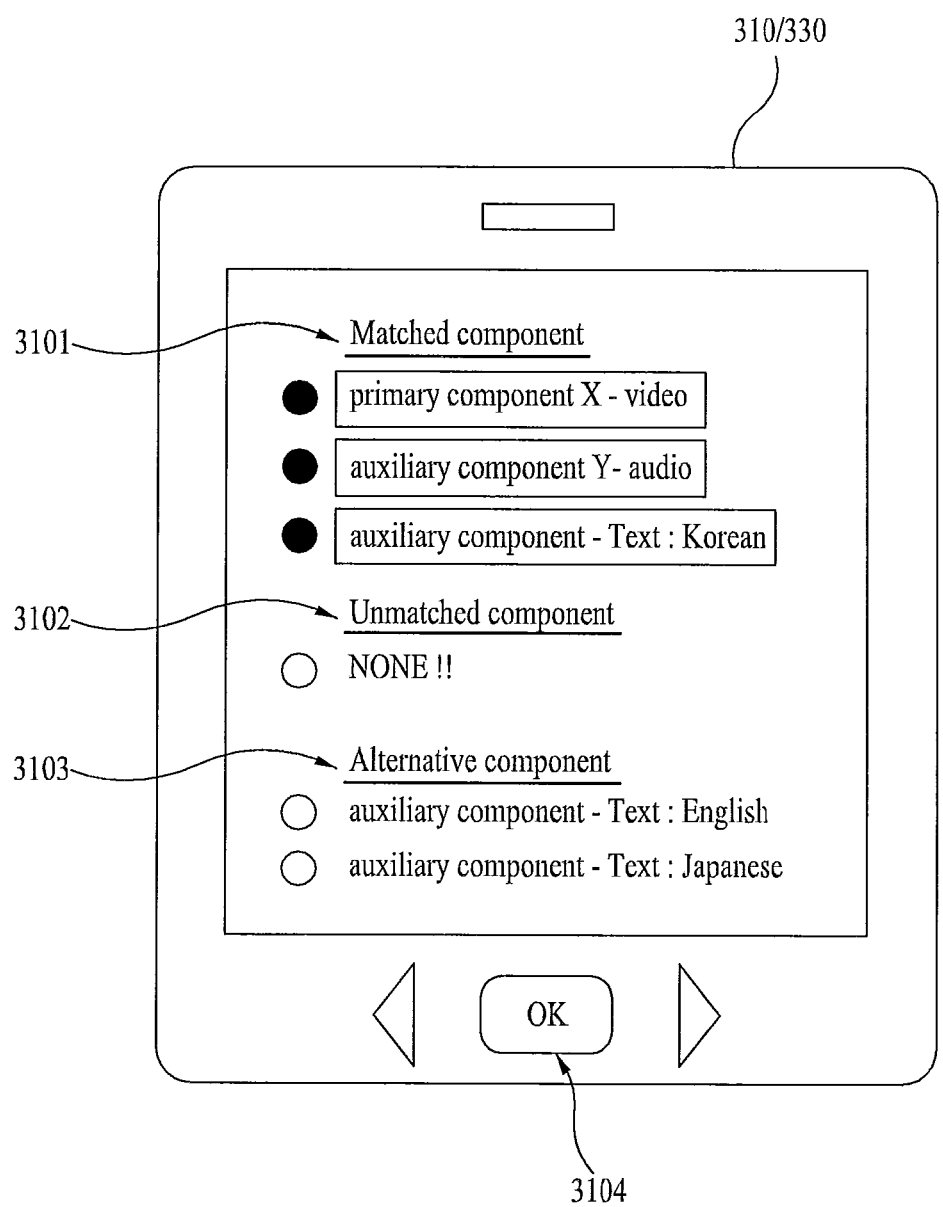
Figure 15B:
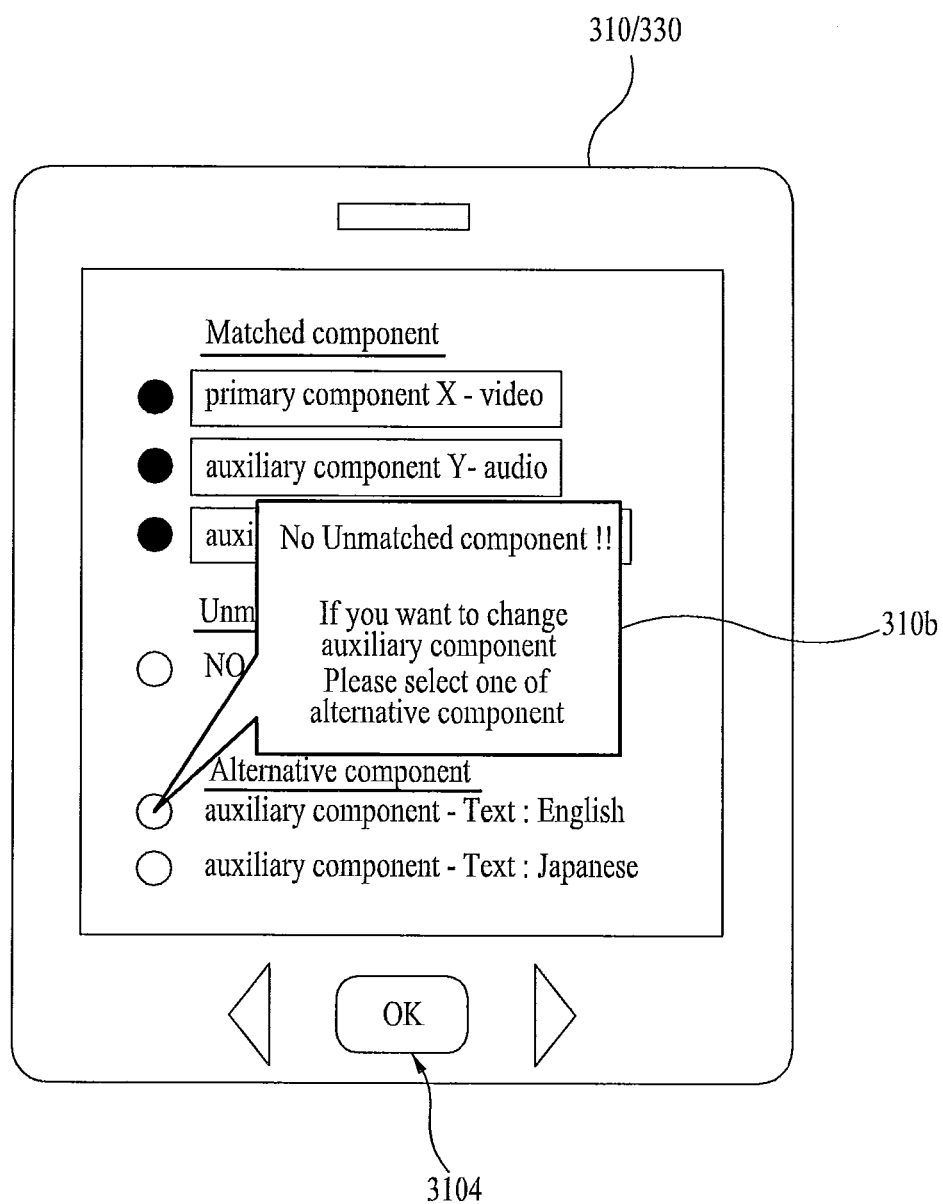
Figure 15C:
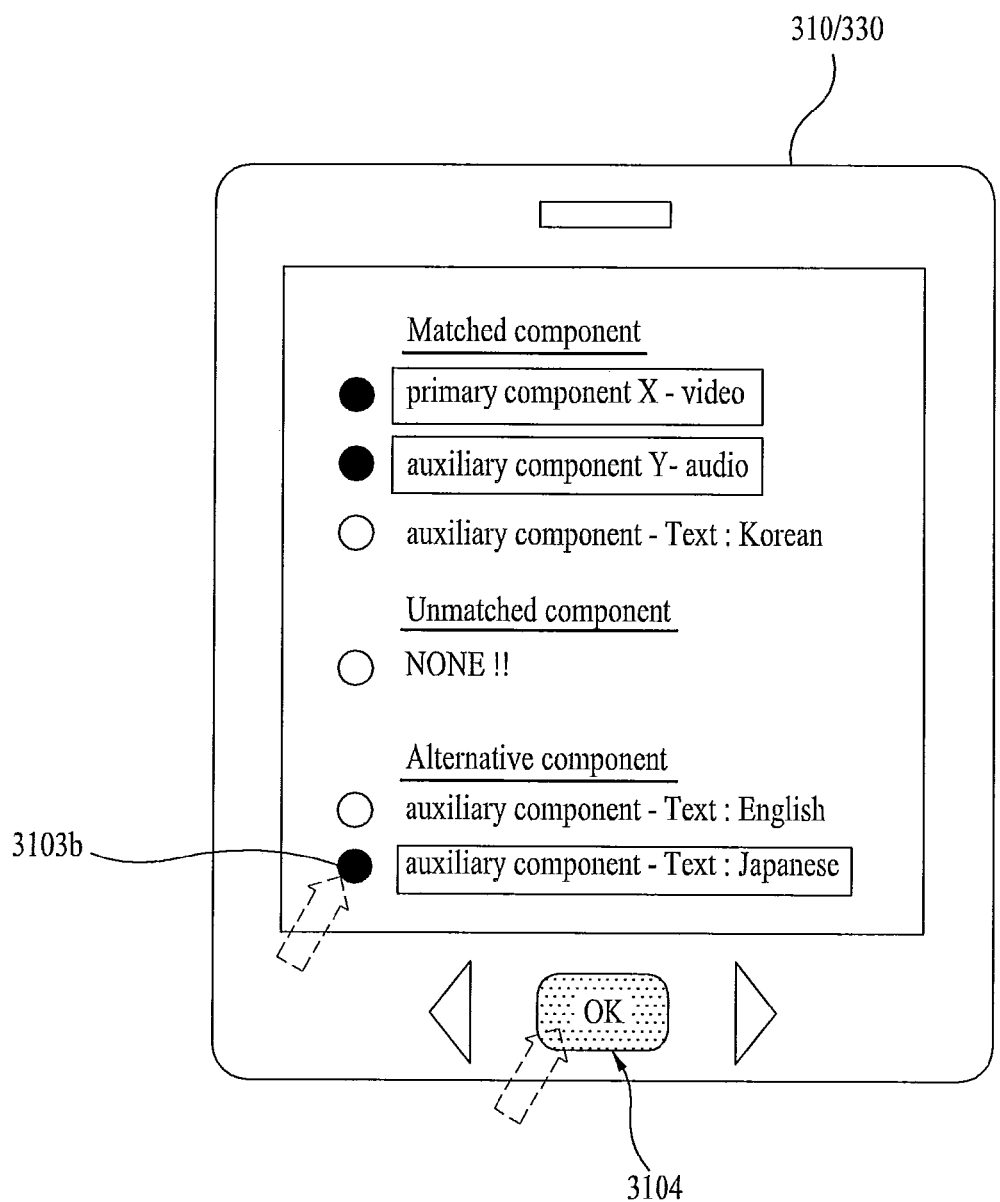

FIGS. 15A~15C illustrate a second example of a UI screen according to the present embodiment. For instance, the UI screen of CP provides three areas as like a matched component area 3101, an unmatched component area 3102, and an alternative component area 3103. The detailed disclosure about the component of content provided within the areas 3101, 3102 and 3103 may be same as disclosed in FIG. 14A above. Referring to the FIG. 15B, if all component content is provided in the matched area 1301 and there is at least alternative component content existed in the alternative area 1303, the UI screen instantly may provides a pop-up window 310*b* guiding a message as like 'No Unmatched Component, if you want to change an auxiliary component, please select one of alternative component'. As the guiding message, a user can easily select one of alternative component (e.g., auxiliary component—Text Japanese 1303*b* as an alternative of matched auxiliary component—Text Korean) in a alternative component area 3103 if the user wishes, as shown in FIG. 15C.

According to the FIG. 14C or 15C, if a selection of component content which is desired to be performed playback at current renderer (e.g., renderer B) is completed, execution button 3104 is finally activated.

Referring back to the FIG. 13A, if multi-streaming contents which are desired to be performed playback at the current renderer (e.g., renderer B) are finally decided (1310) using the UI screen as above, the CP 310 invokes actions of GetRenderingInfo( ) S1303 and RequestPlayTimeInfo( ) S1304 to the previous renderer A 330 based on the decision (or selection) 1310 of multi-streaming contents to be performed a playback at new current renderer. From the actions of GetRenderingInfo( ) S1303 and RequestPlayTimeInfo( ) S1304, the CP receives playing status information of multi-streaming contents which was performed at the previous renderer A 330. For instance, the playing status information includes rendering information and playing time information. The rendering information comprises attributes of position, size, display aspect etc which are related to representation of selected content. The playing time information comprises at least one of playing total time, playing start time, and played time.

Figure 16:
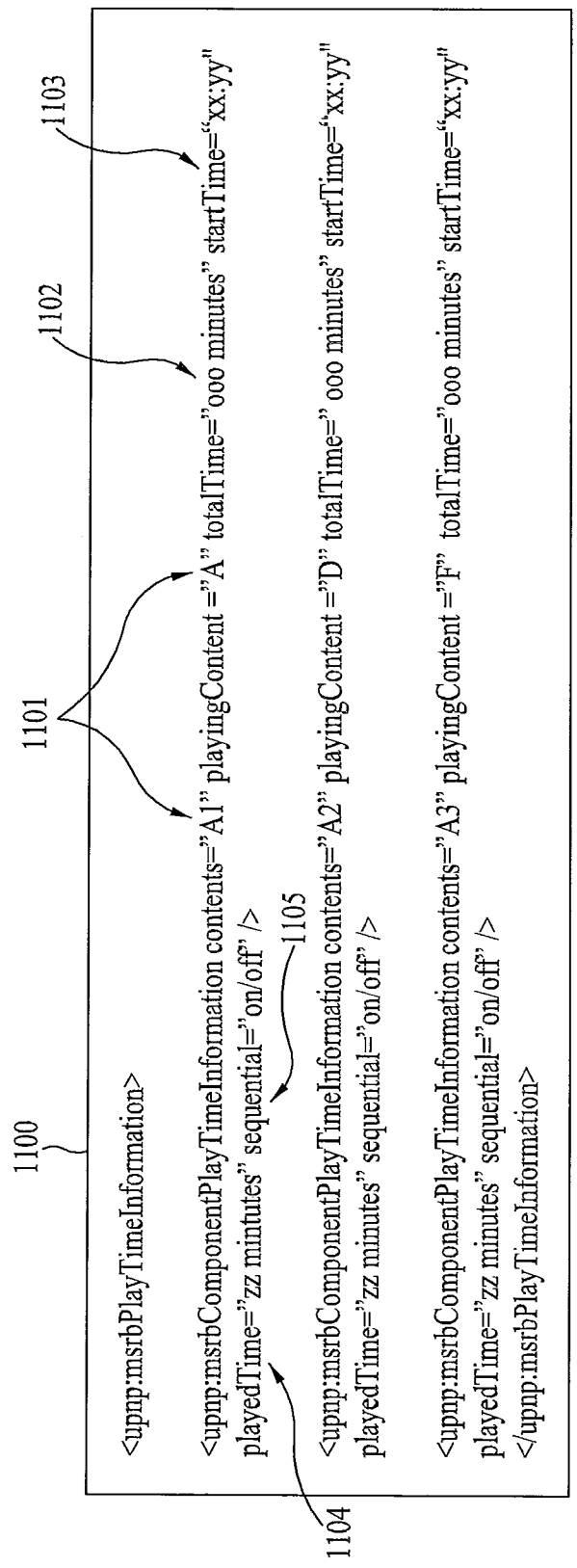
FIG. 16 illustrates a structure of playing time information to be used changing media renderers in example of UPnP AV network according to an embodiment of the present invention.

FIG. 16 illustrates an exemplary structure of the playing time information. The structure of the playing time information can be transmitted as a form of 'msrbPlayTimeInformation' 1100. The structure 1100 comprises one or more identifiers 1101, time information (1102, 1103, 1104) and a sequential indicator 1105.

The identifiers 1101 identify the selected content (e.g., A1-A, A2-D, A3-F in the example of FIG. 4) which is required time information from the CP 310. The time information includes at least one of total playback time ('totalTime') 1102, playing start time ('startTime') 1103 and playback duration time ('playedTime') 1104. The total playback time ('totalTime') 1102 indicates an overall playing time from start to end of the corresponding content. The playing start time ('startTime') 1103 indicates an actual clock time of starting the playback (e.g., 07:30 PM). The playback duration time ('playedTime') 1104 indicates playback execution (duration) time from the playing start time ('startTime') 1103. Consequently, the CP can easily recognize a playback position where the corresponding content (e.g., A1-A 1101) was performed a playback at the previous renderer based on the time information.

Furthermore, the sequential indicator 1105 included in the structure 1100 indicates whether the current renderer B 340 performs a playback of multi-streaming content sequentially or not. That is, if the sequential indicator 1105 lies 'ON', the multi-streaming content should be seamlessly performed a playback from the content which follows content performed on the playback duration time ('playedTime') 1104 of the previous renderer A 330. In contrast, if the sequential indicator 1105 lies 'OFF', the multi-streaming content can be performed playback without a seamless position so that the CP will designate new playback position irrespective of the playback duration time ('playedTime') 1104 of the previous renderer A 330.

Referring back to the FIG. 13A, if the CP 310 is finished checking all information from the actions of S1303 and S1304, the CP invokes actions of 'close' connection S1305 between the media server 320 and the previous media renderer A 330 and 'play( )' S1305 to the current media renderer B 340.

Furthermore, the CP generates current playing information of streaming content which is determined to be performed at the current media renderer B 340, based on the all previous actions S1301, S1302, S1303, S1304 and 1310. The generated current playing information is transmitted to the media server 320 and the current media renderer B 340 to use communication between them as an example form of 'GET_Current_Play_Info' S1307, S1308. For instance, if the sequential indicator 1105 of 'msrbPlayTimeInformation' lies 'ON' or a user wants to seamlessly performs a playback, the CP 310 may creates the current playing information including current playing time information for seamless playback based on the time information (1102, 1103, 1104) of 'msrbPlayTimeInformation' and including an indicator representing the seamless playback. Also, for instance, If the sequential indicator 1105 of 'msrbPlayTimeInformation' lies 'OFF' or a user does not want to seamlessly performs a playback, the CP 310 may creates the current playing information including current playing time information indicating a new start position irrespective of seamless playback referring to the time information (1102, 1103, 1104) of 'msrbPlayTimeInformation' and including an indicator representing the playback without seamless. A structure of the current playing time information can be formed as a similar structure of 'msrbPlayTimeInformation' shown in FIG. 16.

After receiving the invocation S1305, S1306, S1307 and S1308, the media server 320 and the media renderer B 340 can communicate data between them according to an action S1309. The action S1309 can comprises a plurality of sub-operations like the operations 593-1, S93-2, S94-1, S94-2, S94-3, S95 and S96 as disclosed in FIG. 3. Therefore, the detailed disclosure of S1309 will be omitted.

FIG. 13B illustrate an exemplary embodiment of FIG. 12. In particular, FIG. 13B represents an exemplary embodiment that the UPnP network includes a device which has operation function of both a renderer A 330 and a CP together. That is, in FIG. 13B, the CP 310 and the renderer A 330 belong to the same device 310/330.

Therefore, the detailed disclosure of FIG. 13A can be fully applied to the FIG. 13B, except from the actions of S1303 and S1304. The actions of S1303 and S1304 are necessary when two related devices (CP and media renderer A) are physically separated. But, since the embodiment of FIG. 13B shows an exemplary of the operation of control point (CP) and the renderer belonging to the same device 310/330, the actions of S1303 and S1304 can be excluded. The signal arrow 331 of FIG. 12 between the media renderer A 330 and the media renderer B 340 can be applied to an exemplary of the media renderer A 330 having an operation function as the CP 310. Further, since the other signal flows of FIG. 13B are similar operation of FIG. 13A, the detailed disclosure will be omitted.

Figure 17:
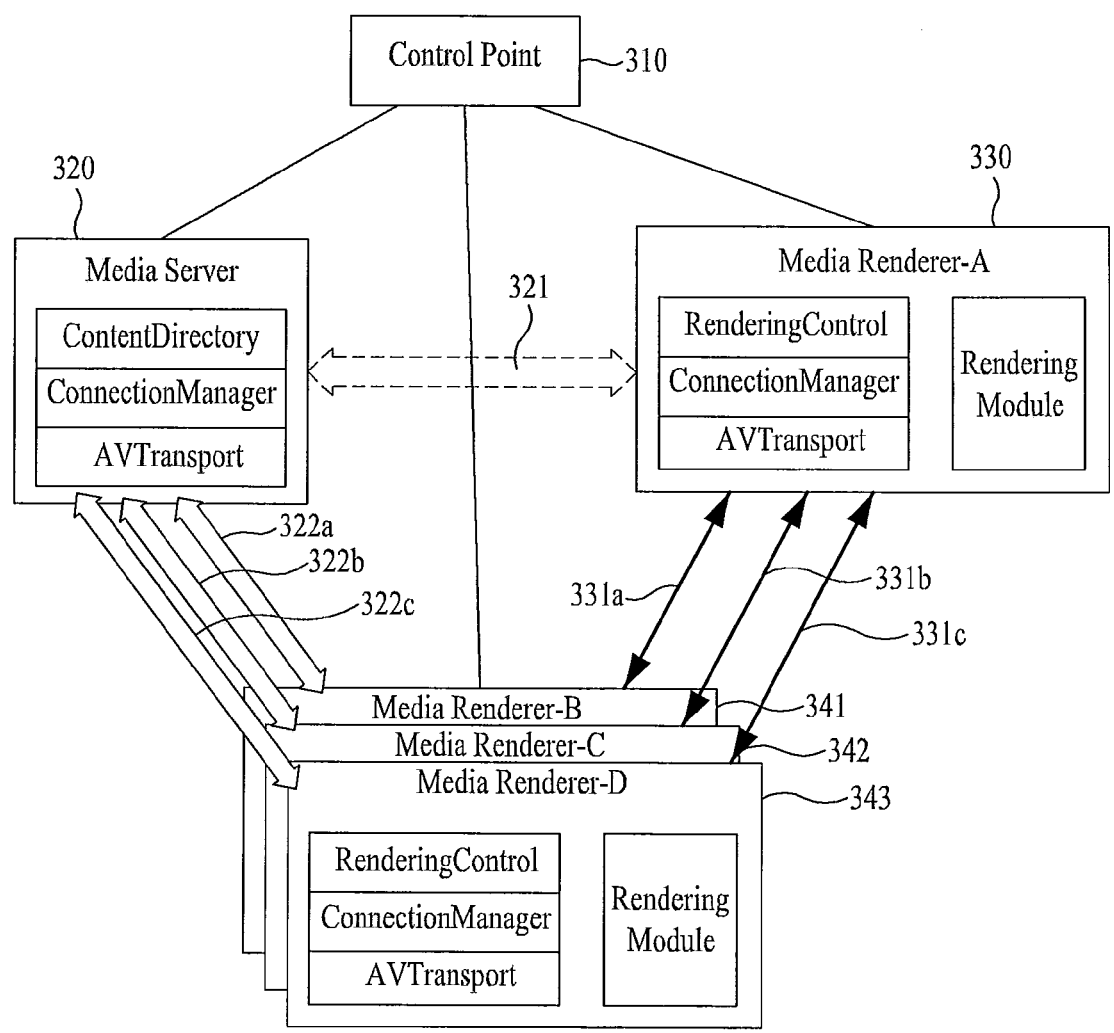
FIG. 17 illustrates changing media renderers in example of UPnP AV network according to an embodiment of the present invention.

FIG. 17 illustrates extended exemplary embodiment of FIG. 12, where the number of new current media renderers are more than at least two. For instance, new current media renderers are consisted of renderer B, C and D (341,342,343) so that each media renderer can only perform a playback of specific streaming content included in the multi-streaming content. In a detailed example, it assumes that the new current renderer B 341 can be only for performing a playback of primary component content such as video streaming content, the new current renderer C 342 can be only for performing a playback of auxiliary component content such as audio streaming content, and the new current renderer D 343 can be only for performing playback of auxiliary component content such as captioned Text streaming content. Consequently, the media server 320 transmits the specific streaming content to the suitable media renderer as an exemplary arrow 322a, 322b and 322c. Furthermore, the signal arrows 331a, 331b, 331c of FIG. 17 between the media renderer A 330 and media renderers B(341), C(342) and D(343) respectively can be applied to an exemplary of the media renderer A 330 has an operation function as the CP 310. Further, since the other signal flows of FIG. 17 are similar operation of FIG. 13A or FIG. 13B, the detailed disclosure will be omitted.

The exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet).

According to an exemplary embodiment of the present invention, a user can easily handle and perform a playback of multi-streaming contents and the user can perform a playback of multi-steaming contents with changing media renderer (player) using an illustrated structure of multi-steaming contents.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling for changing a media player from a first player to a second player, in a control device, comprising:
   transmitting a request of multi-streaming capability to the second player;
   receiving information on multi-streaming capability from the second player, the information on multi-streaming capability defining multi-streaming contents performable in the second player, the multi-streaming contents including at least one primary stream component and at last one secondary stream component, wherein the at least one primary stream component is related to a mandatory playback stream;
   receiving streaming content information and playing status information from the first player, the playing status information including playing time information of streaming content being performed at the first player;
   comparing the information on multi-streaming capability of the second player with the streaming content information of the first player;
   selecting streaming content desired to be performed at the second player according to the result of the comparing of the information of the second player with streaming content being performed at the first player;
   generating current playing information of the streaming content that is determined to be performed at the second player, based on the playing time information; and
   transmitting information about the streaming content desired to be performed at the second player and the current playing information of the streaming content to a media server which is able to communicate with the second player,
   wherein the playing time information includes at least one of total playback time, start time and playback duration time, and
   wherein the current playing information includes information indicating that the second player performs playback of streaming content which sequentially follows content performed on the playback duration time.

2. The method of claim 1, wherein the at least one secondary stream component is related to an optional playback stream.

3. A method of controlling for changing a media player from a first player to a second player, in the first player, comprising:
   transmitting a request of multi-streaming capability to the second player;
   receiving information on multi-streaming capability from the second player, the information on multi-streaming capability defining multi-streaming contents performable in the second player, the multi-streaming contents including at least one primary stream component and at last one secondary stream component, wherein the at least one primary stream component is related to a mandatory playback stream;
   generating streaming content information and playing status information, the playing status information including playing time information of streaming content being performed at the first player;
   comparing the multi-streaming capability of the second player with the streaming content information of the first player;
   selecting streaming content desired to be performed at the second player according to the result of the comparing of the information of the second player with streaming content being performed at the first player;
   generating current playing information of the streaming content that is determined to be performed at the second player, based on playing time information of the streaming content being performed at the first player; and
   transmitting information about the streaming content desired to be performed at the second player and the current playing information of the streaming content to a media server which is able to communicate with the second player,
   wherein the playing time information includes at least one of total playback time, start time and playback duration time, and
   wherein the current playing information includes information indicating that the second player performs playback of streaming content which sequentially follows content performed on the playback duration time.

4. The method of claim 3, wherein the at least one secondary stream component is related to an optional playback stream.

5. A method of processing multi-streaming contents in a second player, comprising:
   receiving a request of multi-streaming capability from a control device;
   transmitting information on the multi-streaming capability to the control device in response to the request, the information on multi-streaming capability defining multi-streaming contents performable in the second player, the multi-streaming contents including at least one primary stream component and at last one secondary stream component, wherein the at least one primary stream component is related to a mandatory playback stream;
   receiving information about streaming content desired to be performed at the second player and current playing information of the streaming content from the control device, wherein the current playing information is derived from playing time information of the streaming content previously performed at a first player, and wherein the streaming content is determined by comparing the information on multi-streaming capability of the second player with the streaming content being performed at the first player, and selecting streaming content desired to be performed at the second player according to the result of the comparing of the information of the second player with streaming content being performed at the first player;
   communicating with a media server for receiving the streaming content; and
   performing playback of the streaming content received from the media server based on the current playing information of the streaming content,
   wherein the playing time information includes at least one of total playback time, start time and playback duration time, and
   wherein the performing step performs playback of streaming content which sequentially follows content performed on the playback duration time.

6. The method of claim 5, wherein the at least one secondary stream component is related to an optional playback stream.

7. A first player configured to perform a method of controlling a media player to change from the first player to a second player, comprising:
   a rendering module configured to perform playback of streaming content; and
   a non-transitory recording mediums configured to store a computer program, the computer program configured to perform a computer process, the process comprising:
      transmitting a request of multi-streaming capability to the second player,
      receiving information on multi-streaming capability from the second player, the information on multi-streaming capability defining multi-streaming contents performable in the second player, the multi-streaming contents including at least one primary stream component and at last one secondary stream component, wherein the at least one primary stream component is related to a mandatory playback stream,
      generating streaming content information and playing status information, the playing status information including playing time information of streaming content being performed at the first player,
      comparing the information on multi-streaming capability of the second player with the streaming content information of the first player,
      selecting streaming content desired to be performed at the second player according to the result of the comparing of the information of the second player with streaming content being performed at the first player,
      generating current playing information of the streaming content that is determined to be performed at the second player based on playing time information of the streaming content being performed at the rendering module, and
      transmitting information about the streaming content desired to be performed at the second player and the current playing information of the streaming content to a media server which is able to communicate with the second player,
      wherein the playing time information includes at least one of total playback time, start time and playback duration time, and
      wherein the current playing information includes information indicating that the second player performs playback of streaming content which sequentially follows content performed on the playback duration time.

8. A second player configured to perform a method of processing streaming content, comprising:
- a non-transitory recording medium configured to store a computer program, the computer program configured to perform a compute process, the process comprising:
- receiving a request of multi-streaming capability from a control device,
- transmitting information on the multi-streaming capability to the control device in response to the request, the information on multi-streaming capability defining multi-streaming contents performable in the second player, the multi-streaming contents including at least one primary stream component and at last one secondary stream component, wherein the at least one primary stream component is related to a mandatory playback stream,
- receiving information about streaming content desired to be performed at the player and current playing information of the streaming content from the control device,
- communicating with a media server for receiving the streaming content, wherein the current playing information is derived from playing time information of streaming content previously performed at a first player, and wherein the streaming content is determined by comparing the information on multi-streaming capability of the second player with streaming content being performed at the first player, and
- performing playback of the streaming content received from the media server based on the current playing information of the streaming content,
- wherein the playing time information includes at least one of total playback time, start time and playback duration time, and
- wherein the performing step performs playback of streaming content which sequentially follows content performed on the playback duration time.

9. A non-transitory computer-readable recording medium having embodied thereon a computer program configured to perform a method of controlling a media player to change from a first player to a second player, the method comprising:
- transmitting a request of multi-streaming capability to the second player;
- receiving information on multi-streaming capability from the second player, the multi-streaming capability defining multi-streaming contents performable in the second player, the multi-streaming contents including at least one primary stream component and at last one secondary stream component, wherein the at least one primary stream component is related to a mandatory playback stream;
- generating streaming content information and playing status information, the playing status information including playing time information of streaming content being performed at the first player;
- comparing the information on multi-streaming capability of the second player with the streaming content information of the first player;
- selecting streaming content desired to be performed at the second player according to the result of the comparing of the information of the second player with streaming content being performed at the first player;
- generating current playing information of the streaming content that is determined to be performed at the second player, based on playing time information of the streaming content being performed at the first player; and
- transmitting information about the streaming content desired to be performed at the second player and the current playing information of the streaming content to a media server which is able to communicate with the second player,
- wherein the playing time information includes at least one of total playback time, start time and playback duration time, and
- wherein the current playing information includes information indicating that the second player performs playback of streaming content which sequentially follows content performed on the playback duration time.

* * * * *